(12) United States Patent
Nakajima et al.

(10) Patent No.: US 7,667,760 B2
(45) Date of Patent: Feb. 23, 2010

(54) IMAGE SENSOR OUTPUT CORRECTION DEVICE

(75) Inventors: Atsushi Nakajima, Sayama (JP); Sukeyuki Shinotsuka, Sayama (JP)

(73) Assignee: Honda Giken Kogyp Kabushiki Kaisha, Tokyo (JP)

( * ) Notice: Subject to any disclaimer, the term of this patent is extended or adjusted under 35 U.S.C. 154(b) by 925 days.

(21) Appl. No.: 10/512,936

(22) PCT Filed: Apr. 14, 2003

(86) PCT No.: PCT/JP03/04726

§ 371 (c)(1), (2), (4) Date: Jul. 28, 2005

(87) PCT Pub. No.: WO03/094110

PCT Pub. Date: Nov. 13, 2003

(65) Prior Publication Data

US 2005/0285959 A1    Dec. 29, 2005

(30) Foreign Application Priority Data

| May 2, 2002 | (JP) | 2002-167861 |
| May 2, 2002 | (JP) | 2002-167862 |
| Jun. 5, 2002 | (JP) | 2002-200615 |

(51) Int. Cl.
H04N 5/222 (2006.01)
H04N 5/228 (2006.01)
H04N 5/76 (2006.01)

(52) U.S. Cl. ............ 348/333.12; 348/222.1; 348/231.99; 348/333.01

(58) Field of Classification Search ........... 348/333.12, 348/256
See application file for complete search history.

(56) References Cited

U.S. PATENT DOCUMENTS

| 5,414,463 A * | 5/1995 | Katoh et al. ............. 348/240.2 |
| 6,008,844 A * | 12/1999 | Tsuda et al. ............ 348/333.02 |
| 6,191,408 B1 * | 2/2001 | Shinotsuka et al. ....... 250/208.1 |
| 6,593,970 B1 * | 7/2003 | Serizawa et al. ............ 348/362 |
| 2002/0041404 A1 * | 4/2002 | Shinotsuka et al. ......... 358/514 |

FOREIGN PATENT DOCUMENTS

JP        2000-329616        11/2000

\* cited by examiner

*Primary Examiner*—Sinh Tran
*Assistant Examiner*—Wanda M Negron
(74) *Attorney, Agent, or Firm*—Fulbright & Jaworski LLP

(57) ABSTRACT

An output compensating device capable of effectively correcting pixel signals composing an image taken and output by the image sensor having a wide dynamic range to be adaptively displayed with high quality and high contrast on a viewable screen area by using means for detecting a minimal value and a maximal value of sensor (pixel) signals output from the image sensor to be displayed on the screen area, means for offsetting the detected minimal value of the sensor signal to a lower limit value of the screen area and means for adjusting a gain of the sensor signal in such a way that an output width determined by the detected minimal and maximal values of the sensor signals may be equal to the maximal width or a specified width of the screen area.

12 Claims, 36 Drawing Sheets

IMAGE SENSOR OUTPUT CORRECTION DEVICE

BACKGROUND OF THE INVENTION

The present invention relates to an output compensating device for compensating for variations in pixel outputs of an image sensor.

In a conventional MOS type image sensor, a light sensor circuit used as a unit pixel comprises, as shown in FIG. 1, a photo-diode PD operating as a photoelectric converting element for producing a sensor current proportional to the quantity of incident light Ls falling thereon, a transistor Q1 having a logarithmic output characteristic in a weak inverse state for converting the sensor current produced in the photodiode into a voltage signal Vpd, a transistor Q2 for amplifying the voltage signal Vpd and a transistor Q3 for outputting a sensor signal Vo in accordance with a timing pulse of a readout signal Vs and which circuit is characterized by its a wide dynamic range obtained by giving the output a logarithmic characteristic, thereby achieving the high sensitivity of detecting a light signal.

The above-described light sensor circuit of the image sensor can produce a sensor current in the transistor Q1 while a sufficient quantity of light Ls is falling on the photodiode PD and therefore detect a light signal at a response speed sufficient not to produce an afterimage of the pixel owing to a relatively small value of resistance of the transistor Q1. However, since the transistor Q1 is set to operate with resistance increased by one order when a current therein decreases by one order, decreasing the current flowing in the transistor Q1 with a decrease in the quantity of incident light Ls falling on the photodiode PD causes the transistor Q1 to rapidly increase its resistance. At the same time, a time constant of the circuit containing a parasitic capacitor C of the photodiode PD with the increased resistance is increased to elongate time necessary for removing electric charge accumulated in the parasitic capacitor C. Consequently, an afterimage can be viewed for a longer duration as the quantity of incident light Ls decreases.

FIG. 6 shows a characteristic change of the voltage signal Vpd when the sensor current of the photodiode PD rapidly changed from 1E-10A to 1E-15A. As is apparent from the characteristic of FIG. 6, if a pixel signal Vo is output at an interval of 1/30 seconds at a small sensor current of 1E-12A with a small quantity of light falling on the photodiode PD, the voltage signal Vpd cannot be saturated within the above time interval. Thus, the saturation time of a voltage signal Vpd corresponding to a sensor current in the photodiode PD with a decreased quantity of incident light thereto also increases. Therefore, if a pixel signal Vo is output in accordance with timing pulses of a reading signal Vs as shown in FIG. 8, then an output appears with an afterglow that may be of a higher level at an earlier time. In FIG. 8, Vpd' designates an inverse amplified voltage signal produced by the amplifying transistor Q2.

Japanese Laid-Open Patent Publication No. 2000-329616 discloses a conventional MOS transistor type image sensor composed of a number of a light sensor circuits arranged to form a matrix of pixels, each of which can produce in a photoelectric converting element a sensor current proportional to the quantity of incident light when the image sensor is taking a picture and convert the sensor current into a voltage signal by a MOS type transistor having a logarithmic output characteristic in a weak inverse state and which is also capable of initializing itself before detecting a pixel signal Vo by removing electric charge accumulated in a parasitic capacitor C of the photodiode PD by changing a drain voltage VD of the transistor Q1 to a level lower than a normal for a specified period. This enables the light sensor circuit to immediately obtain a voltage signal corresponding to the quantity of incident light Ls at that time even if a sensor current rapidly changed. Thus, the light sensor circuit may not cause an afterglow of the pixel even with a small quantity of incident light Ls.

As shown in FIG. 3, the above-described light sensor circuit may output a signal with a logarithmic characteristic at a normal quantity of sensor current corresponding to a normal quantity of incident light falling on a photodiode but it may not maintain the logarithmic output characteristic and may have a substantially linear output characteristic at a decreased sensor current due to a delay of charging the parasitic capacitor of the photodiode. In FIG. 3, WA represents a region of responding with a non-logarithmic characteristic output and WB represents a region of responding with a logarithmic characteristic output.

In case of applying an image sensor using the above-described light sensor circuits for taking an image of, for example, a white divisional line indicated on a road ahead of a vehicle running thereon by using an automatic running control system, it can always provide a high quality road image clearly indicating the white line on the road owing to its wide dynamic range enough to take the image of the subject under severe conditions, e.g., with a great change in brightness of the subject while taking video day and night or when taking video from an entrance or an exit of a tunnel. However, the image sensor using light sensor circuits each presenting a unit pixel and having a logarithmic output characteristic cannot effectively use its wide dynamic range if an output range of each sensor (pixel) signal is narrower than a viewable screen area DA for displaying an image taken by the image sensor as shown in FIG. 9.

On the other hand, a constant difference of brightness between a white line and a road is maintained day and night, sensor signals detected by respective light sensor circuits can represent a constant difference of luminosity and can be easily processed by logarithmic operation.

The light sensor circuit having the logarithmic output characteristic and provided with a means for initializing itself for preventing the occurrence of an afterimage may not exhibit its logarithmic output characteristic at a small sensor current produced in a photodiode PD in accordance with a small quantity of light falling thereon (with low level of illumination) as shown in FIG. 3 because of a delay in charging a parasitic capacitor of the photodiode.

The image sensor thus constructed, specifically, using light sensor circuits possessing a logarithmic output characteristic involves such a problem that the image sensor may not effectively use its wide dynamic range if an output range of each sensor (pixel) signal is narrower than a display screen area DA for displaying an image taken by the image sensor.

In an image sensor using light sensor circuits each of which represents a unit pixel and works in such a manner that, when taking an image by the image sensor, sensor current corresponding to a quantity of incident light is produced and converted by a photoelectric element into an electric voltage having a logarithmic characteristic in a weak inverse state using the sub-threshold region property of the transistor and, then, a sensor signal corresponding to the voltage signal is produced and output while initializing itself before detecting a pixel signal by removing electric charge accumulated in a parasitic capacitor C of the photodiode PD by changing a drain voltage of the transistor to a level lower than a normal for a specified period, there is still a problem that each light sensor circuit may loose its logarithmic output characteristic at a low level of illumination.

SUMMARY OF THE INVENTION

An object of the present invention is to provide an output compensating device for the above-described image sensor, which is capable of correcting pixel signals composing an image taken and output by the image sensor to be adaptively displayed on a viewable screen area of a display and is provided with a means for detecting a minimal value and a maximal value of sensor (pixel) signals output from respective light sensor circuits of the image sensor to be displayed on a display screen area, a means for offsetting the detected minimal value of the sensor signal to a lower limit value of the display screen area and a means for adjusting a gain of respective sensor signals to bring an output width determined by the detected minimal value and the detected maximal value of the sensor signals to the maximal width or a specified width of the display screen area, wherein the pain adjustment of the sensor signals is conducted by using a memory storing a table of preset gain-compensation characteristic values corresponding to output width values of sensor signals.

Another object of the present invention is to provide an output compensating device for the image sensor, which is capable of correcting pixel signals composing an image taken and output by the image sensor in real time without delay in response so as to be suitably displayed on a viewable screen area of a display and is provided with a means for temporally storing a series of pixel signals output from the image sensor on an image memory, a means for detecting a minimal value and a maximal value of sensor (pixel) signals output from respective light sensor circuits of the image sensor to be displayed on the display screen area, a means for offsetting the pixel signals read from the image memory to make the detected minimal value of the sensor signal equal to a lower limit value of the display screen area and a means for adjusting a gain of the sensor signal to bring an output width determined by the detected minimal value and the detected maximal value of the sensor signals to match the maximal width or a specified width of the display screen area, wherein the gain adjustment of the senor signal is conducted by using a memory storing a table of preset gain-compensation characteristic values corresponding to output width values of sensor signals.

Another object of the present invention is to provide an image sensor output compensating device which is capable of working with an image sensor composed of light sensor circuits each representing a unit pixel and each producing in a photoelectric converting element (photodiode) a sensor current proportional to a quantity of light falling thereon and converting the current into a voltage signal by a transistor with a logarithmic output characteristic in a weak inverse state and outputting a sensor signal corresponding to the converted voltage and each removing a charge accumulated in a parasitic capacitor of the photoelectric converting element by changing a drain voltage of the transistor to a value lower than a normal value for initializing itself before detecting a light signal, and is capable of securing the logarithmic output characteristics of respective pixel signals output from the respective light sensor circuits in non-logarithmic response region with a decreased quantity of incident light by using a means for converting the non-logarithmic output characteristic of sensor signals into logarithmic.

PREFERRED EMBODIMENTS OF THE PRESENT INVENTION

Figure 1:
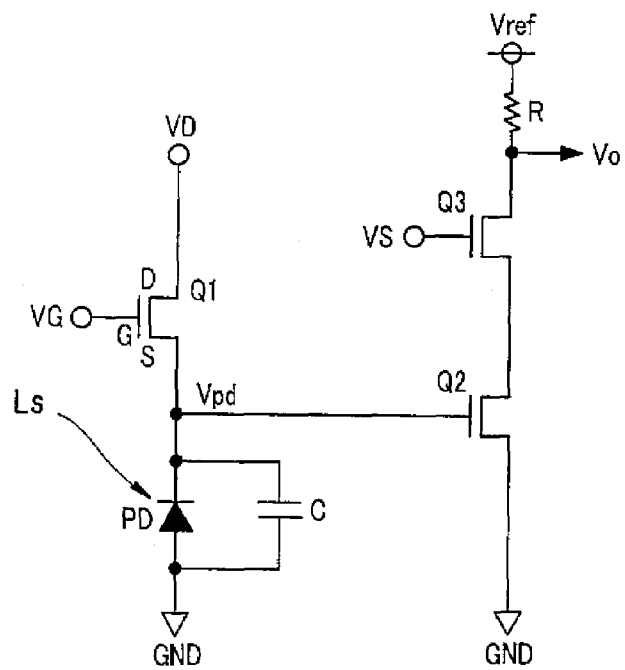
FIG. 1 is an electric circuit diagram of a light sensor circuit for one pixel, which is used as a unit component of an image sensor according to the present invention.

In an image sensor to which an output compensating device of the present invention is applied, a light sensor circuit illustrated in FIG. 1 is used as a unit pixel. The light sensor circuit is capable of initializing itself before detecting a sensor signal by removing electric charge accumulated in a parasitic capacitor C of a photodiode PD by changing a drain voltage VD of a transistor Q1 for logarithmic output conversion to a level lower than a normal for a specified period.

Figure 2:
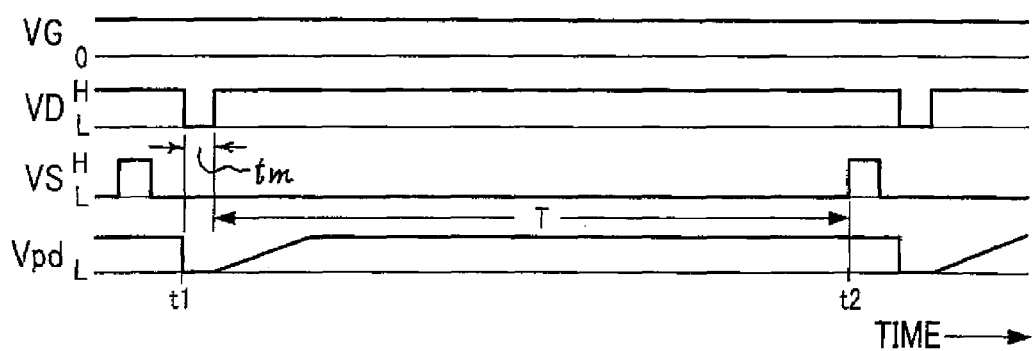
FIG. 2 is a time chart of signals to be generated at respective portions of the light sensor circuit.
Figure 3:
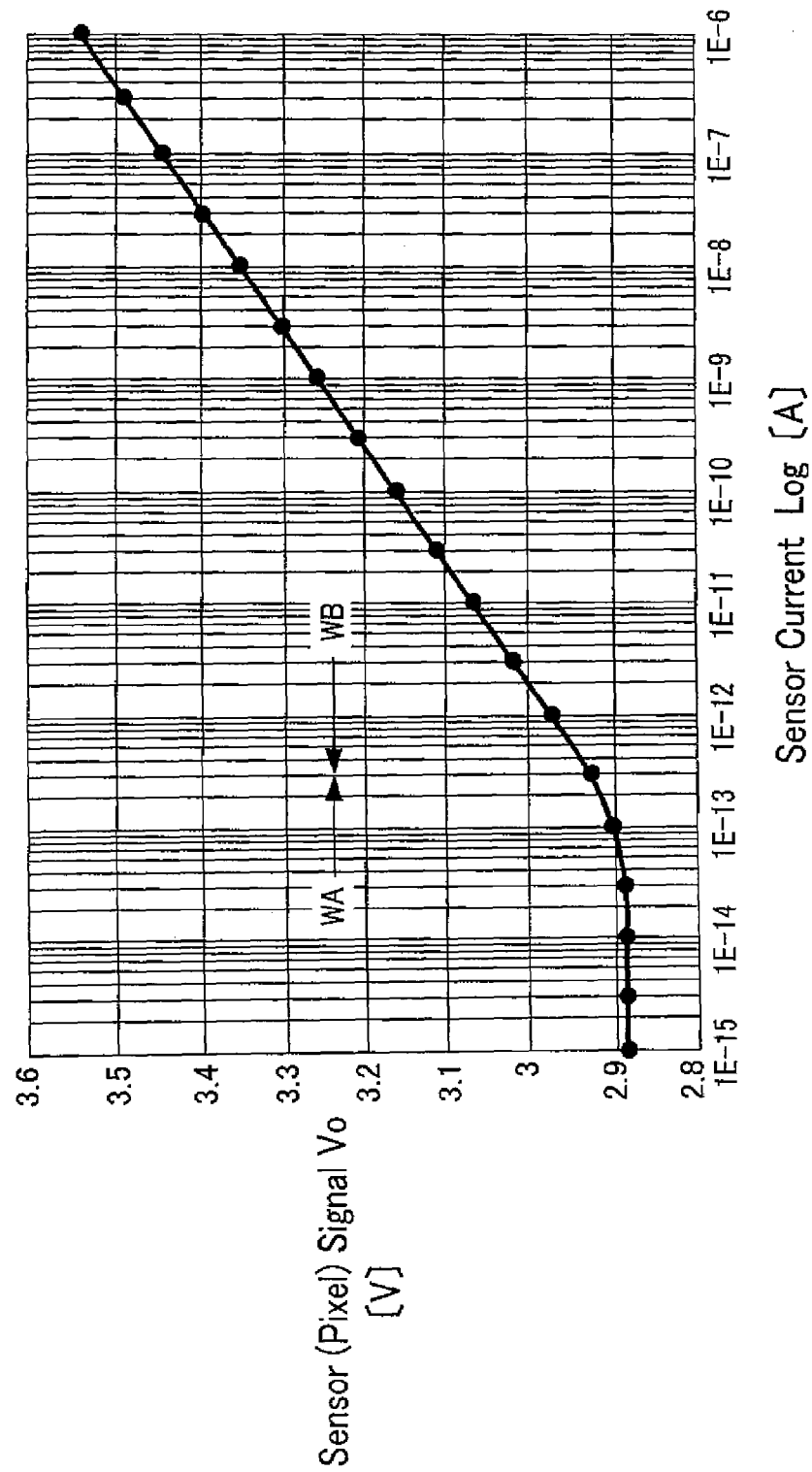
FIG. 3 shows the output characteristic of a sensor (pixel) signal versus a sensor current corresponding to a quantity of incident light to a light sensor circuit which was initialized.

FIG. 2 shows a time chart of signals produced at various portions of the light sensor circuit. In FIG. 2, t1 is an initializing timing pulse and t2 is a light-signal detection timing pulse. A specified time tm for which the drain voltage VD of the transistor Q1 is switched from a normal value (high level H) to a lower voltage value (low level L) and kept at the low level L is set for example to about 5 microseconds in case of reading a pixel at a speed of about 100 nanoseconds. In FIG. 2, T designates a period for accumulating a charge in a parasitic capacitor C of the photodiode PD, which period is about ⅓₀ (or ⅟₆₀) seconds for a NTSC signal.

In the light sensor circuit, once the drain voltage VD of the transistor Q1 was switched over to the low level L for initializing the circuit, the transistor Q1 is brought into the low-resistance state if a potential between the gate voltage VG and the drain voltage VD is greater than a threshold of the transistor Q1. Therefore, the source side potential at that moment becomes equal to the drain voltage VD (in practice, there remains a differential corresponding to the threshold value), causing the junction capacitor of the photodiode PD to be discharged.

Figure 4:
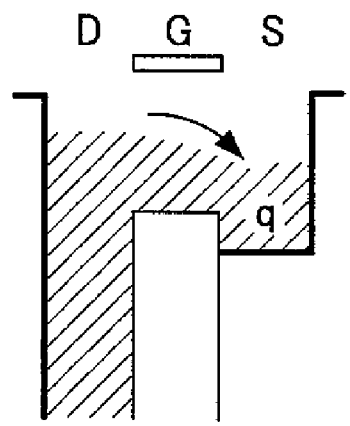
FIG. 4 is a mimic illustration of operation state of a transistor Q1 with a flow of an electric charge (q) therein when initializing a light sensor circuit.

FIG. 4 is a mimic illustration of the operation of the light sensor circuit by a flow of electric charge q of the transistor Q1 when initializing the circuit.

Once the drain voltage VD of the transistor Q1 was changed to the normal value (high level H) with an elapse of the time tm and a light signal was then detected, the source side potential becomes lower than the drain voltage VD. If the difference between the gate voltage VG and the drain voltage VD is larger than the threshold, the MOS type transistor Q1 reaches the low-resistance CP state and allows the junction capacitor C of the photodiode PD to be charged again.

Figure 5:
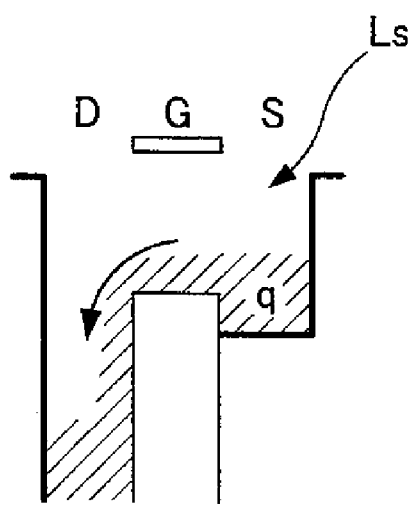
FIG. 5 is a mimic illustration of the operation state of a transistor Q1 with a flow of an electric charge (q) therein when detecting a light signal of the light sensor circuit.

FIG. 5 is a mimic illustration of the operation of the light sensor circuit by a flow of electric charge q of the transistor Q1 when detecting a light signal. The junction capacitor C of the photodiode PD is discharged for initializing the light sensor circuit before detecting a light signal and then charged.

In this case, the output voltage Vpd (a terminal voltage of the photodiode PD) with an elapse of a specified time from the initializing timing attains a value corresponding to the quantity of incident light Ls. In other words, the light sensor circuit after initialization can obtain a discharging characteristic with a specified time constant in response to a change in the quantity of incident light Ls.

In that case, if the light sensor circuit is left as it is for a long time, a current supplied from the drain voltage VD through the transistor Q1 becomes equal to a current flowing in the photodiode PD. The same discharging characteristic can be thus always maintained as far as no charge remains. This prevents the occurrence of afterglow of pixels.

The light sensor circuit can therefore obtain a pixel signal Vo corresponding to the quantity of incident light Ls with no afterglow of the pixel by detecting a light signal with an elapse of a specified time (1/30 seconds) after initialization of the circuit.

Figure 6:
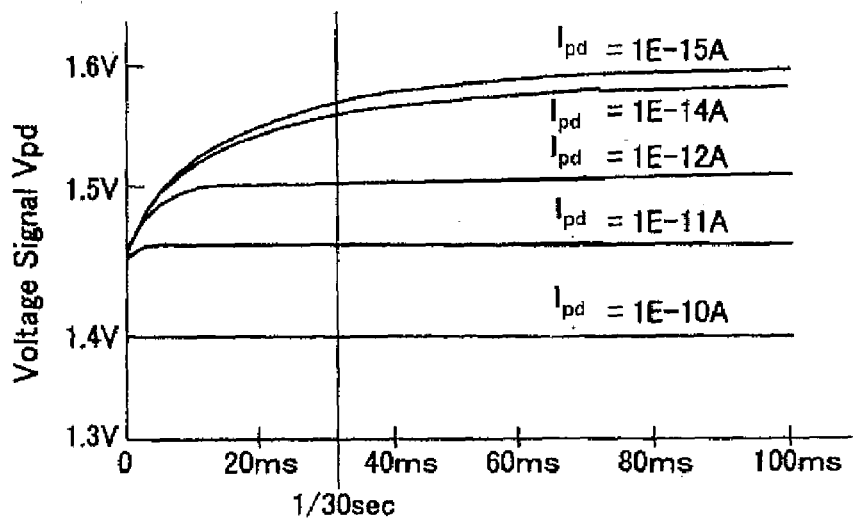
FIG. 6 shows the characteristic change of a voltage signal Vpd with a change in sensor current in a photodiode of the light sensor circuit.

FIG. 6 shows a characteristic change of a voltage signal Vpd with an absurd change in a sensor current of a photodiode PD changed from 1E-10A to 1E-15A in case of detecting a light sensor signal at an interval of 1/30 seconds after initializing the light sensor circuit.

Figure 7:
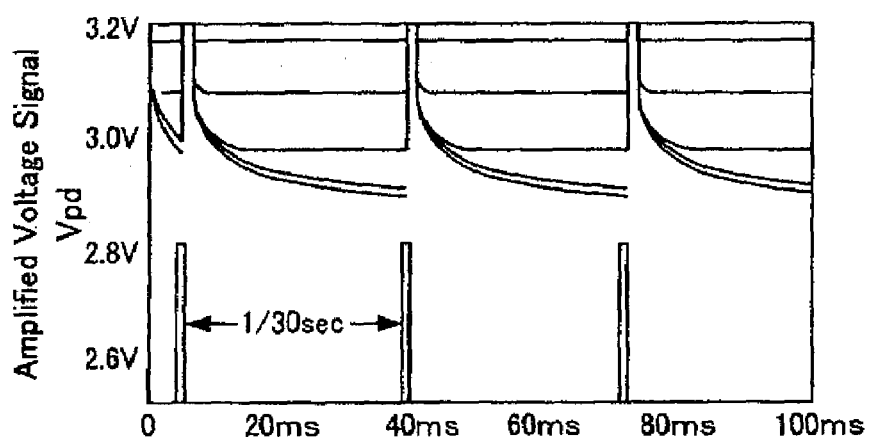
FIG. 7 shows characteristic curves of an amplified voltage signal Vpd when the light signal reading-out operation is repeated at a specified time interval by the light sensor circuit.
Figure 8:
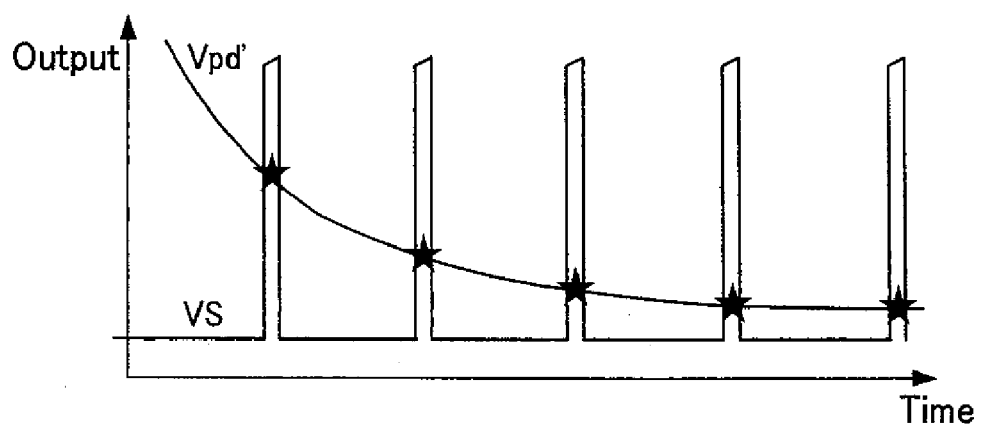
FIG. 8 shows characteristic curves of a pixel signal read out at a specified time interval from a light sensor circuit with a small quantity of incident light when it is operated without initializing the circuit.
Figure 9:
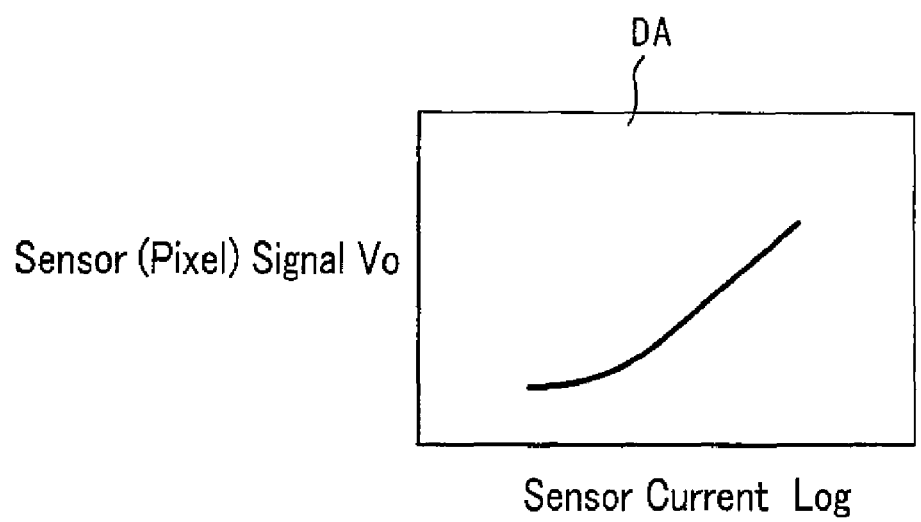
FIG. 9 shows the characteristic of an output range of sensor signal output from a light sensor circuit to be displayed on a display screen area.

FIG. 7 shows characteristics of the amplified voltage signal Vpd when light signals were repeatedly read at an interval of 1/30 sec. The diagram indicates that the signal characteristics obtained every 1/30 seconds correspond to the sensor current proportional to the quantity of incident light Ls falling on the photodiode PD with no effect of afterglow of the pixel.

Figure 46:
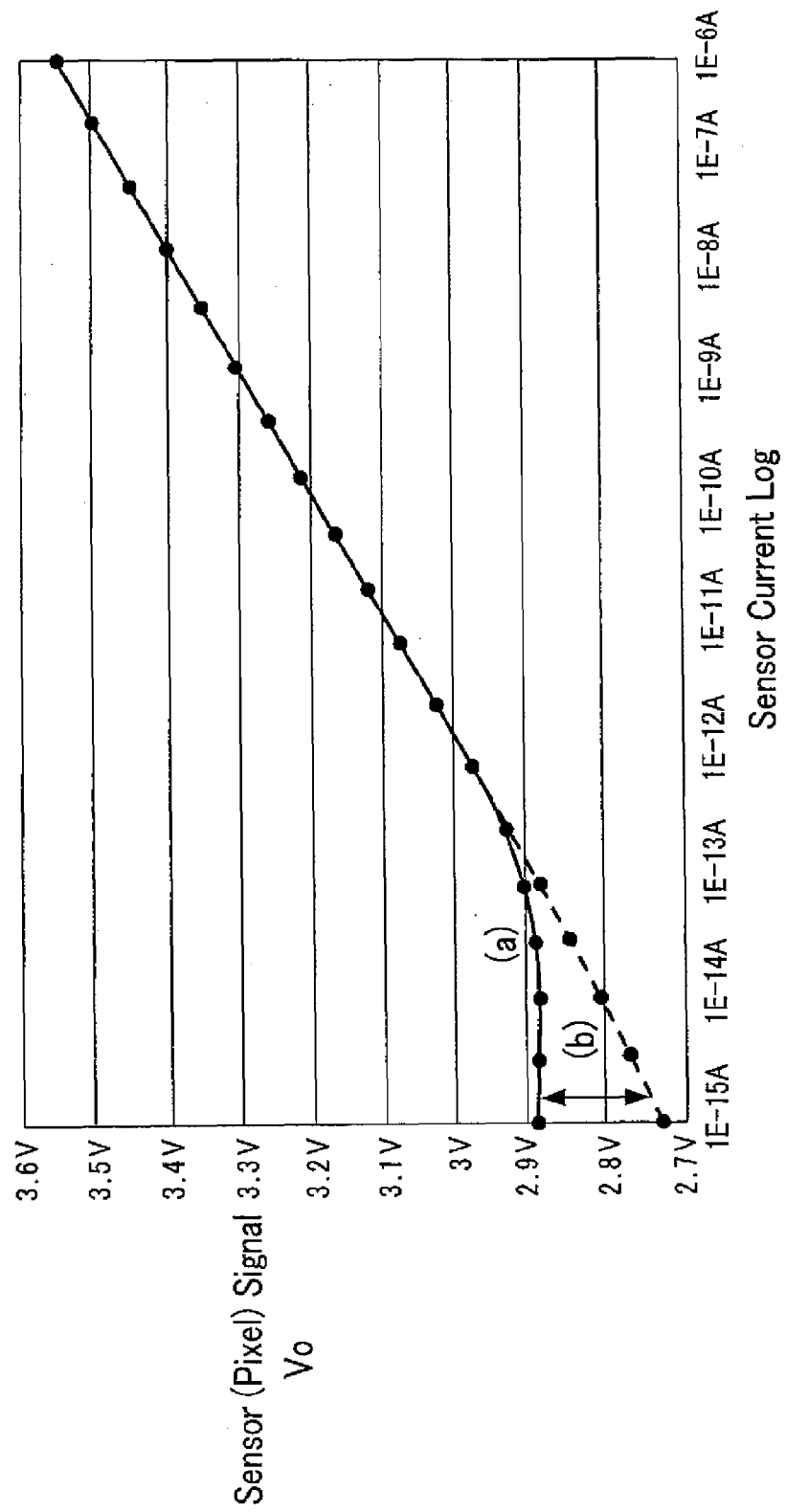
FIG. 46 shows an output characteristic of a sensor signal versus a sensor current when changing a drain voltage of a transistor for converting an output characteristic of a pixel signal into a logarithmic characteristic.

FIG. 46 shows output characteristic curves of a sensor signal Vo versus a sensor current, which were obtained by changing the quantity of incident light Ls falling on the photodiode PD. The diagram indicates that the sensor signal has a complete logarithmic output characteristic at the sensor current of IE-13A or more in the photodiode PD. It is also found that the output signal is not logarithmic at the sensor current of less than IE-13A but does not cause afterglow.

The diagram also indicates that the output characteristic shown in FIG. 46 at (a) can be obtained by adjusting the threshold of the low level L to which the drain voltage VD of the transistor Q1 must be changed over and by decreasing the drain voltage until the transistor Q1 reaches the state of completely low resistance. On the contrary, the normal logarithmic output characteristic shown in FIG. 46 at (b) can be obtained by setting the control voltage VD to the same value that the gate voltage VG has.

Therefore, the output characteristic shown in FIG. 46 at (a) is free from the effect of pixel afterglow but the light signal detecting sensitivity is decreased at a small quantity of incident light while the output at characteristic of FIG. 46 at (b) may obtain high detection sensitivity at a small quantity of incident light but may have a remarkable afterglow. In other words, there is a trade-off relation between the detection sensitivity and afterglow.

Figure 10:
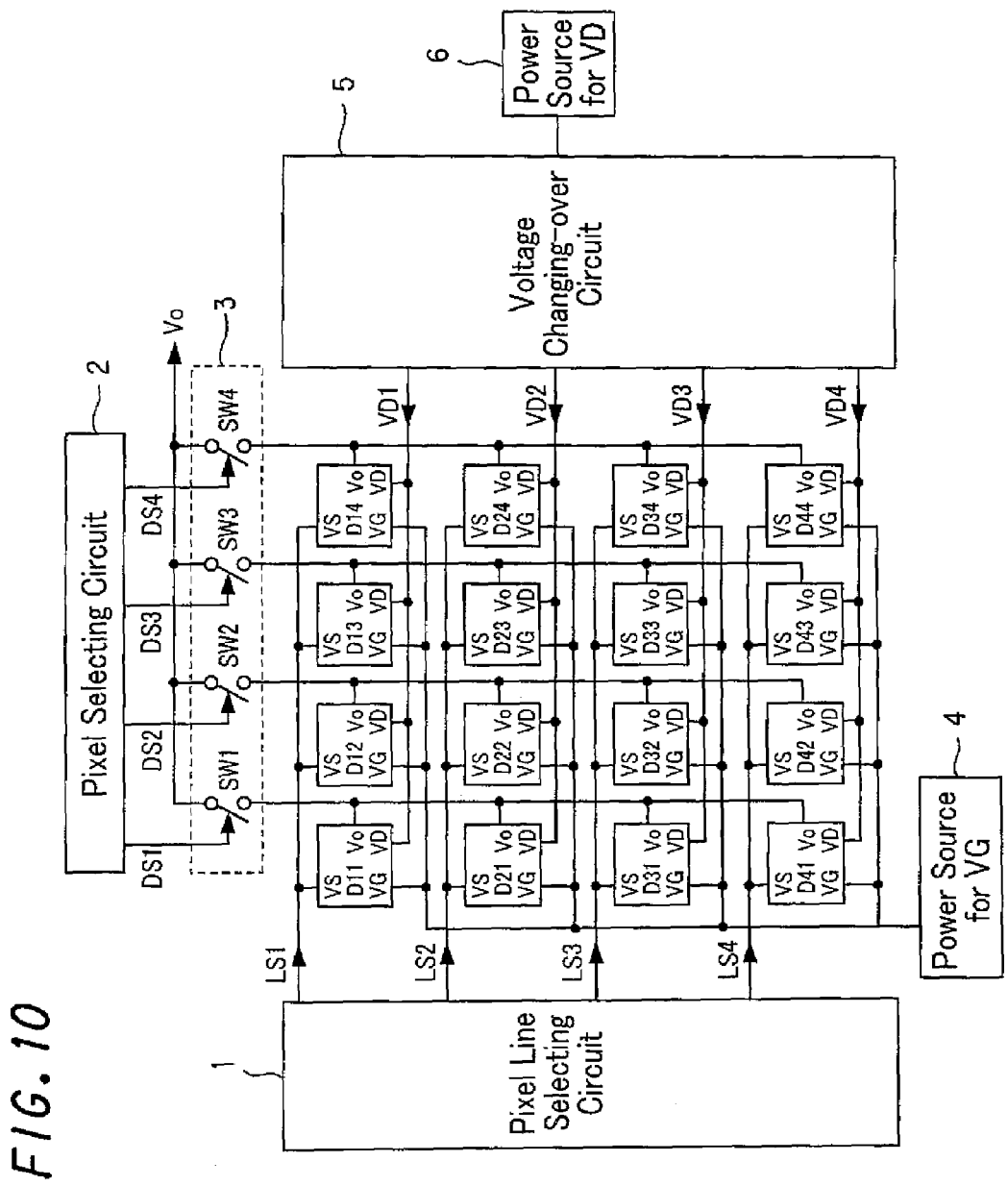
FIG. 10 is a basic block diagram of an image sensor to which the present invention is applied.

In FIG. 10, there is shown an image sensor consisting of a number of the above-described light sensor circuits arranged to form a matrix of pixels (i.e., light sensor circuits), wherein sensor signals representing respective pixels are read by scanning in a time series and the pixels can be initialized in time adapted to the readout-scanning of respective sensor signals.

The image sensor is composed of 4×4 pixels D11~D44 arranged in a matrix of pixel circuits, in which pixel lines are selected one by one with respective selecting signals LS1~LS4 successively output from a pixel line selecting circuit 1 and pixels in each selected pixel line are readout one by one as respective sensor signals in such a manner that selecting signals DS1~DS4 successively output from a pixel selecting circuit 2 turn on corresponding switches SW1~SW4 in a group 3 to read respective pixel signals Vo in a time series. In FIG. 10, numeral 4 designates a power source for gate voltage VG of the transistor Q1 and numeral 6 designates a power source for a drain voltage VD of the transistor Q1.

The image sensor is provided with a voltage switching-over circuit 5 by which a drain voltage VD of each transistor Q1 for each pixel is changed from a normal high-level H to an initializing lower level L and reverse by the effect of specified timing pulses when selecting each line of pixels.

Figure 11:
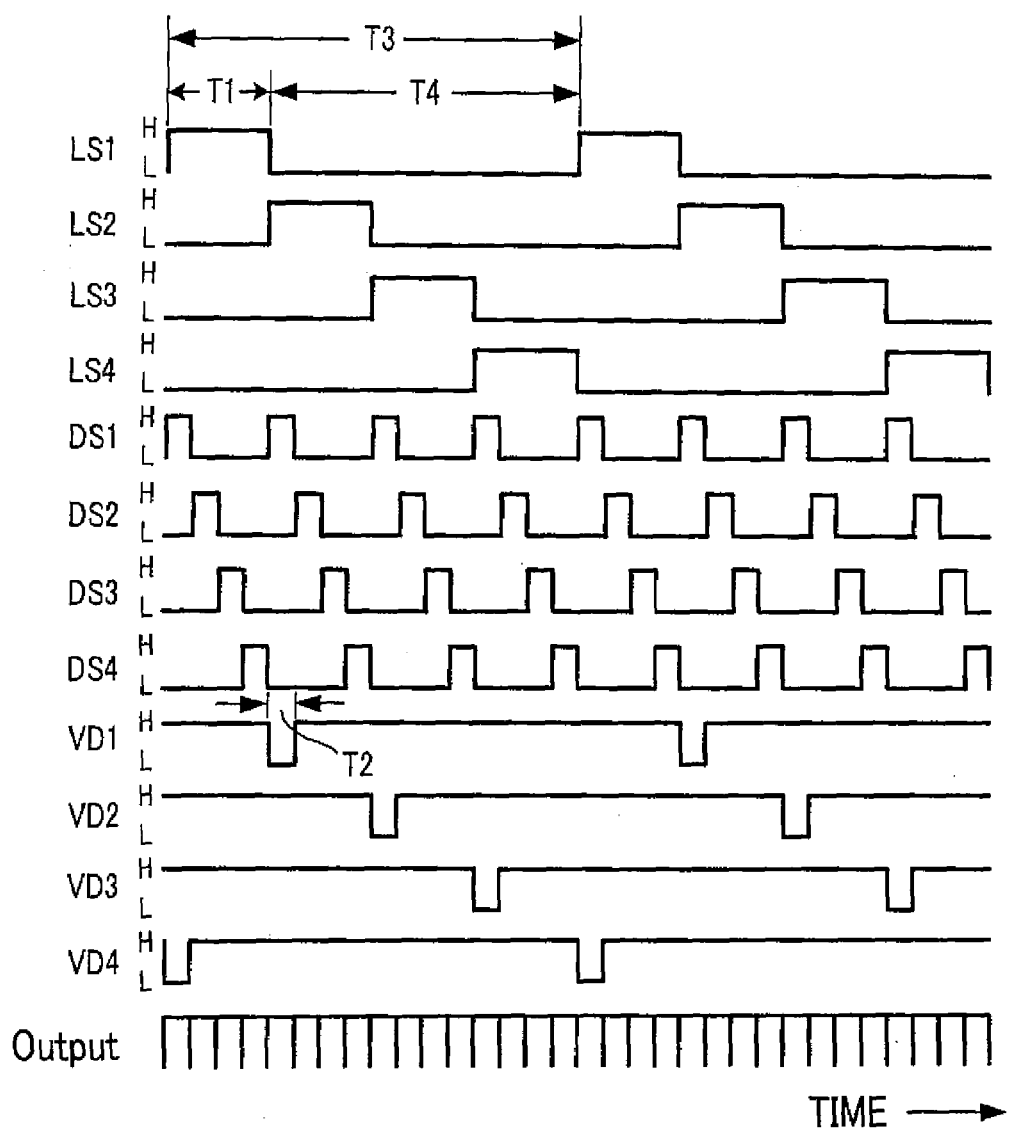
FIG. 11 is a time chart of signals generated by respective portions of the image sensor of FIG. 9.

The operation of the above-described image sensor to which the present invention is applied will be described with reference to FIG. 11 showing a time chart of signals generated at respective portions of the image sensor.

Once the pixel-line selecting signal LS1 reaches the high level H, the first pixel line including pixels D11, D12, D13 and D14 is selected and, during a specified period of the signal LS1 remaining at the high level H, pixel selecting signals DS1~DS4 successively reach the high level H to start the successive reading of pixel signals Vo from the pixels D11, D12, D13 and D14.

As soon as the pixel-line selecting signal LS1 was changed to the low level, a next pixel-line selecting signal LS2 is changed to the high level H to select the second pixel line containing pixels D21, D22, D23 and D24. For a specified period Ti of the signal LS2 remaining at the high level, the pixel selecting signals DS1~DS4 successively reach the high level H to start the successive reading of pixel signals Vo from pixels D21, D22, D23 and D24.

Similarly, with the pixel-line selecting signals LS3 (LS4) changed to the high level H, the third (fourth) pixel line is selected and then, for a specified period T1 for which the signal LS3 (LS4) remains at the high level H, the pixel selecting signals DS1~DS4 successively reaches the high level H to start the successive reading of pixel signals Vo from pixels D31, D32, D33 and D34 (D41, D42, D43 and D44).

When the pixel-line selecting signal LS1 was changed to the low level L after the period T1, the drain voltage VD1 for the pixels D11, D12, D13 and D14 in the first selected line is turned to the low level for a specified period T2 to make the pixels initialized and prepared for the next cycle of reading the pixel signals, which cycle will be performed with elapse of one cycle time T3. When the pixel-line selecting signal LS2 was changed to the low level L after the period T1, the drain voltage VD1 for the pixels D21, D22, D23 and D24 in the second selected line is turned to the low level for the specified period T2 to initialize the pixels for the next sensor-signal reading cycle to be performed with elapse of one cycle time T3.

Similarly, once the pixel-line selecting signal LS3 (LS4) was changed to the low level L after the period T1, the drain voltage VD3 for the pixels in the third (fourth) selected line is turned to the low level to initialize the pixels for the next sensor-signal reading cycle to be performed with elapse of one cycle time T3.

Although the drain voltage VDX is turned to the low level L to initialize each pixel circuit with the pixel-line selecting signal LSX (X=1~4) decreased to the low level with elapse of the period T1, the initializing timing may be within the duration T4 for which the pixel line selection is paused with the pixel-line selecting signal LSX being at the Low level L.

Figure 12:
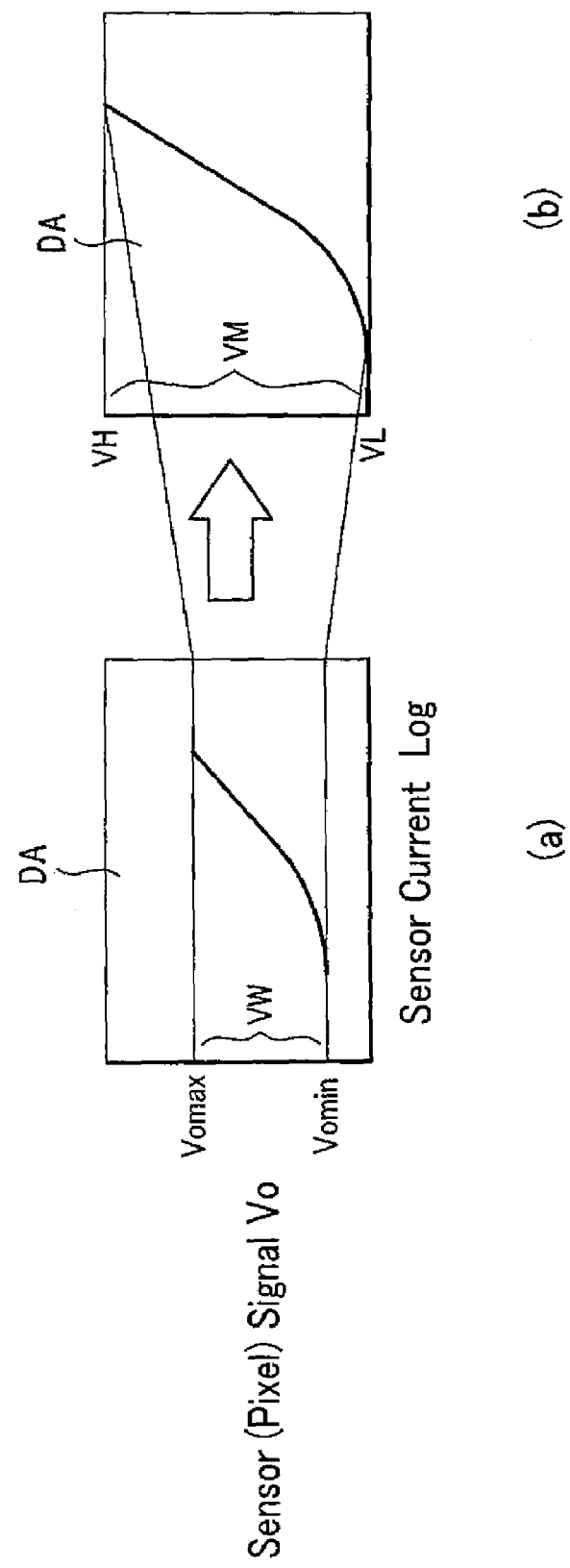
FIG. 12 shows an example of processing states of a sensor output signal when correcting an output range of signals from an image sensor to cover an entire screen area of a display device.

If an output range of respective pixel signals of the above-described image sensor is narrower than a display screen area DA, as shown in FIG. 12(a), on which an image taken by the image sensor is displayed, the image sensor can not efficiently demonstrate the effect of its wide dynamic range using a full viewable screen area of the display. The present invention provides the capability of conducting offset and gain compensation of sensor (pixel) signals output from the image sensor so as to adapt the range of all pixel signals composing an image to be displayed on a full screen area DA of the display unit of the image sensor.

An image sensor output compensating device according to the present invention includes a means for detecting a minimal value Vomin and a maximal value Vomax of sensor (pixel) signals output from respective light sensor circuits of the image sensor to be displayed on a display screen area, a means for offsetting the detected minimal value Vomin of the sensor signal to a lower limit value VL of the display screen area DA and a means for adjusting a gain of the sensor signals in such a way that an output width VW determined by the detected minimal value Vomin and the detected maximal value Vomax of the sensor signals may be equal to the maximal width VM of the display screen area DA.

The present invention also achieves the above-mentioned offset and gain compensation of respective pixel signals in a real time without delay in response in order to display an image composed of the respective pixel signals on a full screen area as shown in FIG. 12(b).

An output compensating device for the image sensor, which is capable of correcting pixel signals composing an image taken and output by the image sensor in real time without delay in response so as to be adaptively displayed on a viewable screen area of a display unit by using a means for temporally storing a series of pixel signals output from the image sensor on an image memory, a means for detecting a minimal value Vomin and a maximal value Vomax of sensor (pixel) signals output from respective light sensor circuits of the image sensor to be displayed on the display screen area, a means for offsetting the pixel signals read from the image memory to make detected minimal value Vomin of the sensor signal equal to a lower limit value VL of the display screen area and a means for adjusting a gain of the sensor signals in such a way that an output width VW determined by the detected minimal value Vomin and the detected maximal value Vomax of the sensor signal may be equal to the maximal width WM of the display screen area.

The gain compensation of the sensor signals can be conducted not only to adapt to a full screen area DA but to any portion thereof. In the latter case, the gain of sensor signals is carried out so as to adapt the output width of the signals between the minimal value and the maximal value to a predetermined width of the portion of the display screen area.

Figure 13:
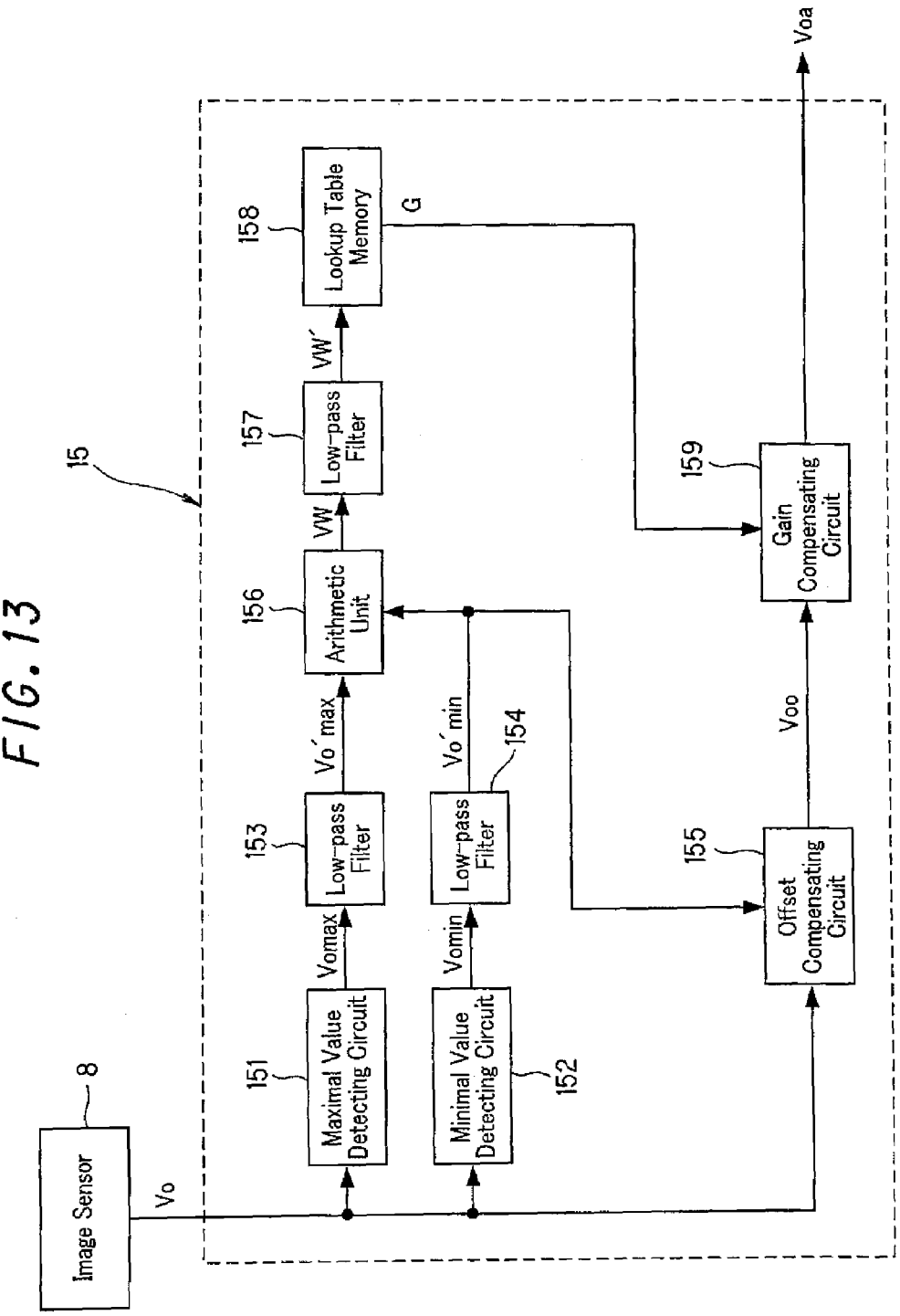
FIG. 13 is a block construction diagram of an output compensating device for an image sensor according to an embodiment of the present invention.

FIG. 13 illustrates a construction of an image sensor output compensating device according to an embodiment of the present invention. The output compensating device 15 comprises a maximal value detecting circuit 151 for detecting a maximal value Vomax of respective pixel signals Vo output from an image sensor 8, a minimal value detecting circuit 152 for detecting a maximal value Vomin of respective pixel signals Vo output from an image sensor 8, a low-pass filter 153 for storing maximal values Vomax detected for several frames (images) and averaging the maximal values in order to absorb an absurd change, a low-pass filter 154 for storing minimal values Vomin detected for several frames (images) and averaging the minimal values Vomin in order to absorb an absurd change, an offset compensating circuit 155 for offsetting a sensor signal Vo by subtracting the averaged minimal value Vo'min from the signal, a subtraction circuit (Arithmetic Unit) 156 for determining a width VW of outputs between the minimal value Vo'min and the maximal value Vo'max, a low-pass filter 157 for averaging the determined output width VW of the sensor signals, a lookup table memory 158 for reading out a specified gain compensation value G in accordance with the averaged output width VW' of the sensor signals and a gain compensating circuit 159 for performing the gain compensation of the offset compensated sensor signal Voo by multiplying the signal Voo by the read-out gain compensating value G. In FIG. 13, Voa designates an offset and gain compensated signal. The low-pass filters 153, 154 and 157 may be FIR filters or IIR filters or moving average filters.

The low-pass filter 157 is not always necessary and may be omitted. The lookup memory 158 stores a table containing a characteristic of gain compensation values G predetermined for compensating the gain of sensor signals of an image sensor so as to make the output width VW' of the signals match the full screen area DA. In the case of making the output width VW' of the sensor signals Vo adapt to a specified window of the display screen area, the characteristic of gain compensation values to achieve the above object are predetermined and stored in the table.

By setting in the table a desirable characteristic of gain compensation values G in accordance with an output width VW' of sensor signals of the image sensor, it is possible to suitably change the characteristic curve of the gain-adjusted sensor signal.

In place of the lookup memory 158, a divider may be used for obtaining a gain compensation value G by dividing the maximal width of the display screen area by output width VW' of an image sensor signal.

According to the present invention, it is also possible to divide the width VW of sensor signals by a predetermined threshold Vs as shown in FIG. 14(a) and conduct the offset and gain compensation of each of divisions as shown in FIG. 14(b).

Figure 15:
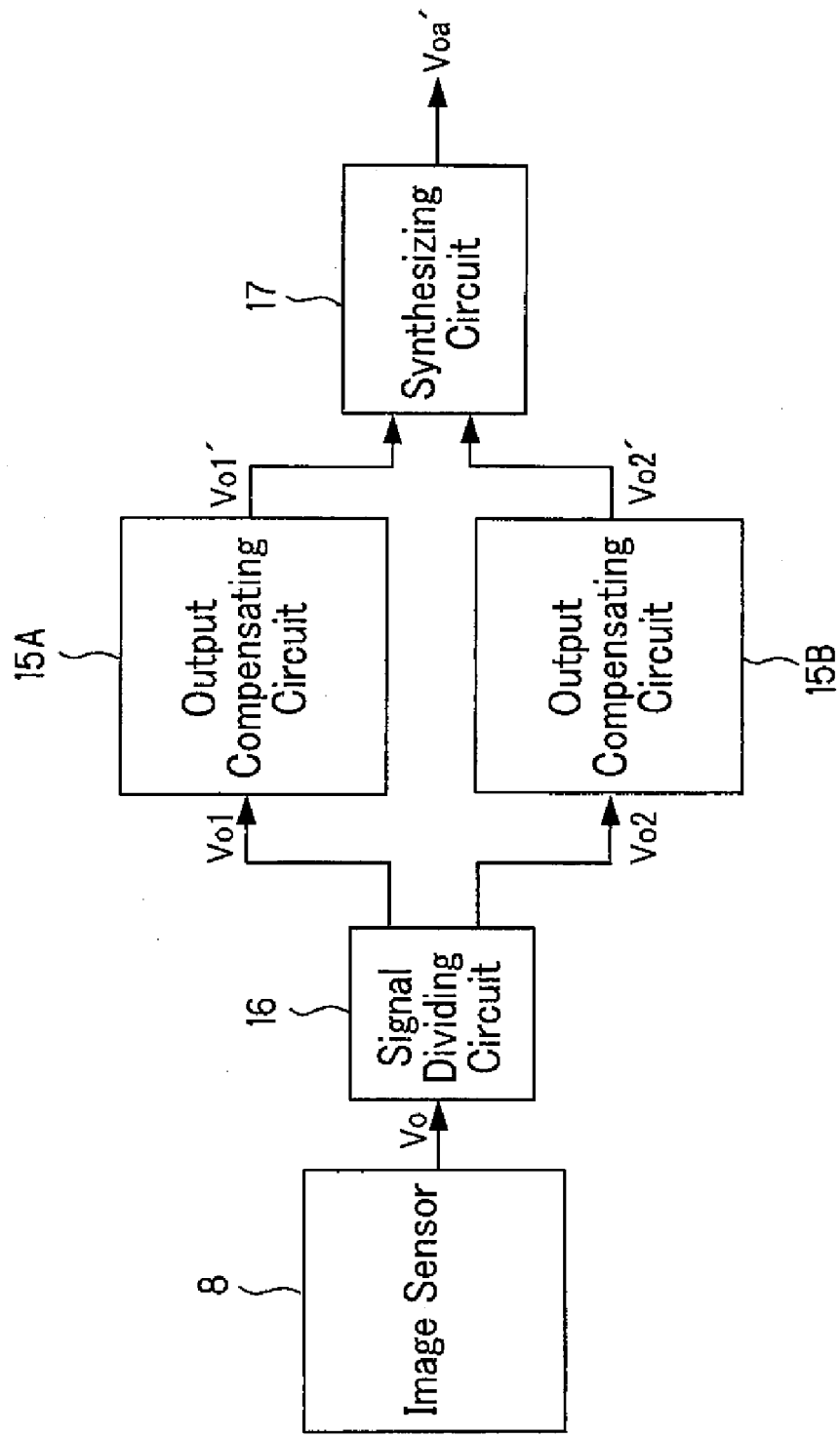
FIG. 15 is a block construction diagram of an output compensating, device for an image sensor according to another embodiment of the present invention.

FIG. 15 shows a construction of an image sensor output compensating device according to an embodiment of the present invention. Each of pixel signals Vo output from a image sensor 8 is divided into two divisions by a signal dividing circuit 16 using a specified threshold Vs and then a divided signal Vo1 is offset and gain compensated by an output compensating device 15A having the same construction as the device shown in FIG. 13 and a divided signal Vo1 is offset and gain compensated by an output compensating device 15B having the same construction as the device shown in FIG. 13. Two offset-and-gain adjusted signals Vo1' and Vo2' are combined with each other by a synthesizing circuit 17 to synthesize a complete pixel signal.

A maximal value of the divided signal VoI is used as a threshold value Vs for offset and gain compensation of the divided signal VoI by the output compensating device 15A and a minimal value of the divided signal Vo2 is used as a threshold value Vs for offset and gain compensation of the divided signal Vo2 by the output compensating device 15B.

According to the present invention, it is also possible to first conduct the offset and gain compensation of each of respective pixel signals composing an image taken by the image sensor, divide the output width of the compensated pixel signals into two divisions by using a preset threshold Vs' as shown in FIG. 16(b) and conduct the offset and gain adjustment of each division of each sensor signal as shown in FIG. 16(c).

Figure 17:
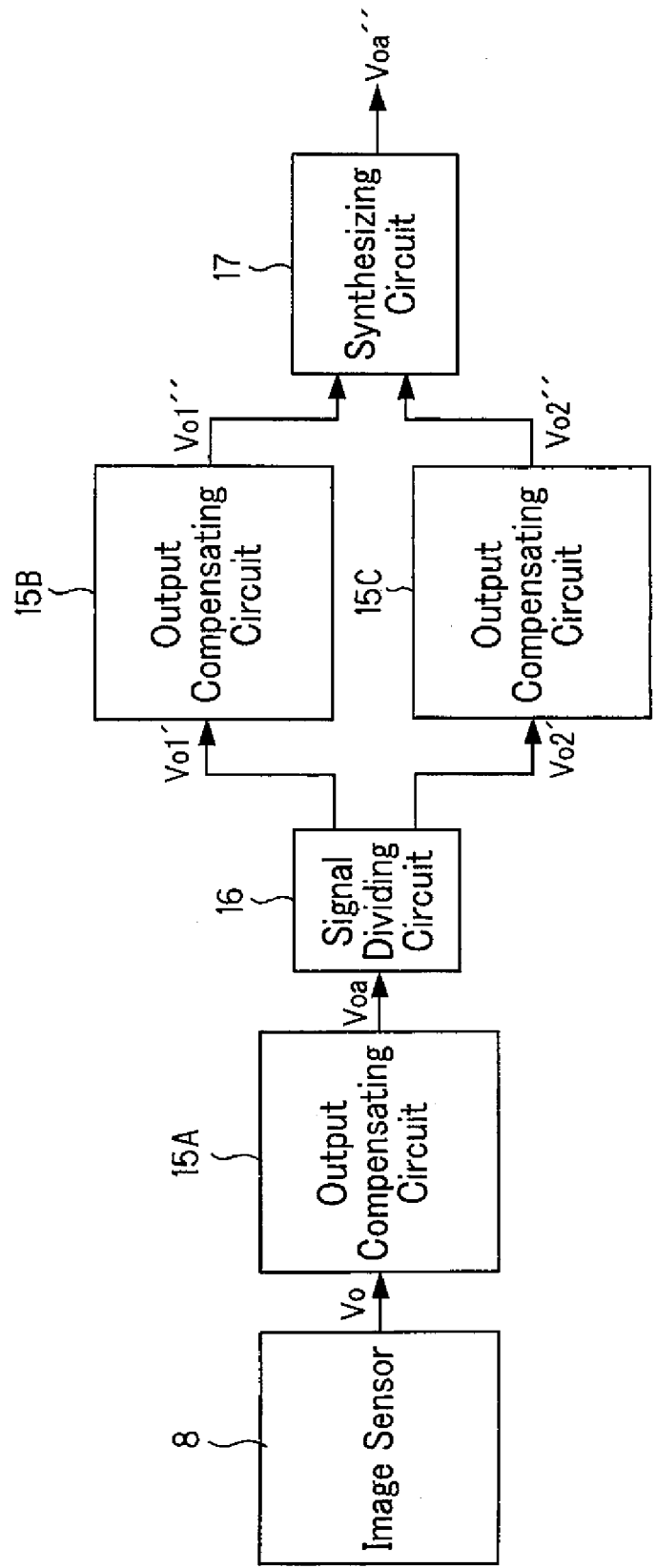
FIG. 17 is a block construction diagram of an output compensating device for an image sensor according to another embodiment of the present invention.

FIG. 17 shows a construction of an image sensor output compensating device for the above purpose. Each of pixel signals Vo output from a image sensor 8 is first offset and gain compensated by an output compensating device 15A similar in construction to that shown in FIG. 13, then the offset-and-gain compensated signal Voa is divided into two divided signals VoI' and Vo2' by a signal dividing circuit 16 using a specified threshold Vs' and the divided signal Vo1' is further offset and gain compensated by an output compensating device 15B similar in construction to the device shown in FIG. 13 and the divided signal Vo2' is offset and gain compensated by an output compensating device 15C similar in construction to the device shown in FIG. 13. Two offset-and-gain adjusted signals VoI" and Vo2" are combined with each other by a synthesizing circuit 17 to synthesize a complete pixel signal Voa".

A maximal value of the divided signals VoI' is used as a threshold value Vs' for offset and gain compensation of the divided signal Vo2' by the output compensating device 15B and a minimal value of the divided signals Vo2' is used as a threshold value Vs' for offset and gain compensation of the divided signal VoI by the output compensating device 15C.

Figure 18:
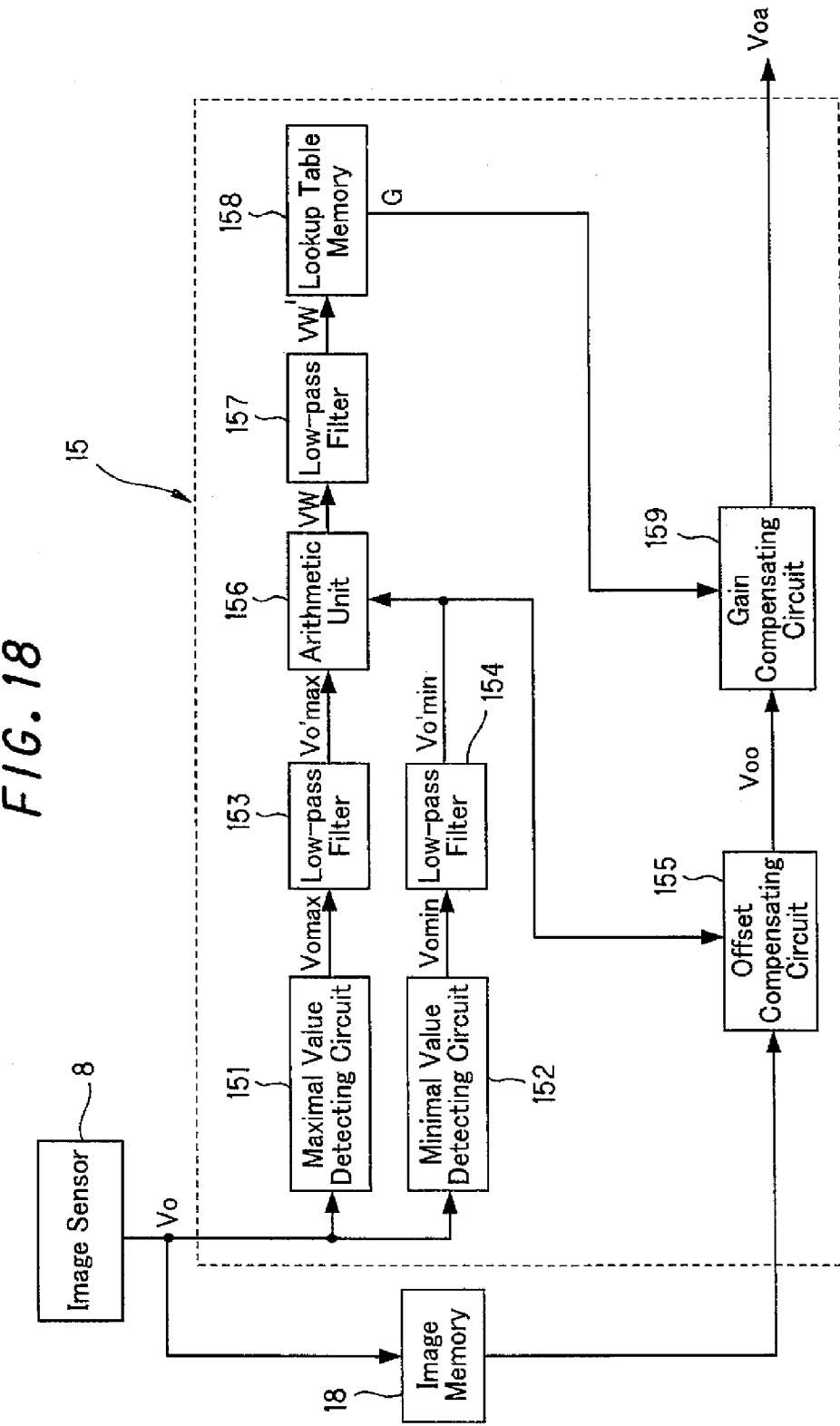
FIG. 18 is a block construction diagram of an output compensating device for an image sensor according to another embodiment of the present invention.

FIG. 18 illustrates an image sensor output compensating device 15 according to another embodiment of the present invention.

In the output compensating system, pixel (sensor) signals Vo composing an image (frame) output in a time series from an image sensor 8 are temporally stored on a central image memory 18 and then read-out from the memory 18 and input to the output compensating device 115. The output compensating device 15 comprises a maximal value detecting circuit 151 for detecting a maximal value Vomax of respective pixel signals output from an image sensor 8, a minimal value detecting circuit 152 for detecting a minimal value Vomin of respective pixel signals output from an image sensor 8, a low-pass filter 153 for storing maximal values Vomax detected for several frames and averaging the maximal values by absorbing an absurd change, a low-pass filter 154 for storing minimal values Vomin detected for several frames and averaging the minimal values Vomin by absorbing an absurd change, an offset compensating circuit 155 for offsetting a sensor signal Vo by subtracting the averaged minimal value Vomin' from each of signals read at a specified interval from the memory 18, a subtraction circuit 156 for determining an output width VW between the averaged minimal value Vo'min and maximal value Vo'max, a low-pass filter 157 for averaging the determined output width VW of the sensor signals, a lookup table memory 158 for reading out a specified gain compensation value G in accordance with the averaged output width VW' of the sensor signal and a gain compensating circuit 159 for performing the gain compensation of the offset-compensated sensor signal Voo by multiplying the signal Voo by the read-out gain compensating value G. In FIG. 18, Voa designates an offset and gain compensated signal. The pixel signals are recorded on the image memory 18 and read-out from the image memory 18 under the control of a CPU (not shown) which performs the control of the whole system operation.

In the above-described image sensor output compensating system, a sequence of pixel signals Vo output from the image sensor 8 are first stored on the image memory 18, then respective signals Vo are read from the memory at a specified timing and offset and gain compensated by the output compensating device 15 which can thus process the signals in a real time without delay in response.

Figure 14:
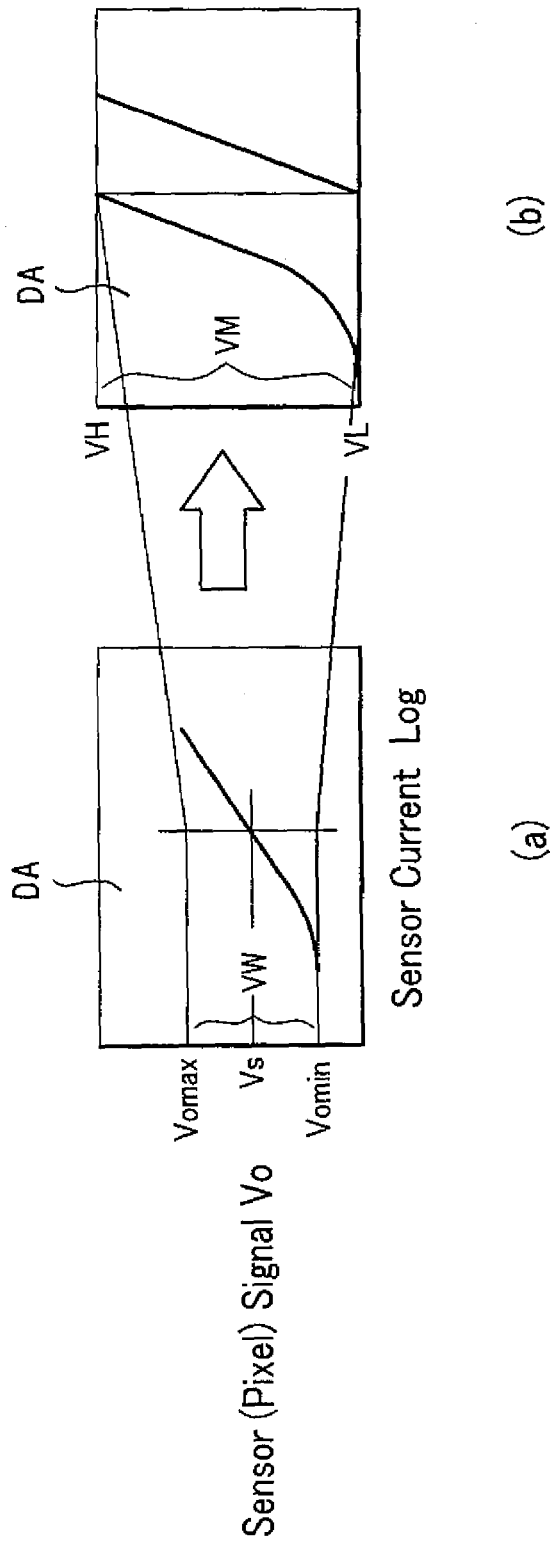
FIG. 14 shows another example of processing states of a sensor output signal when correcting each of divisions of an output range of signals from an image sensor to cover an entire screen area of a display device.
Figure 19:
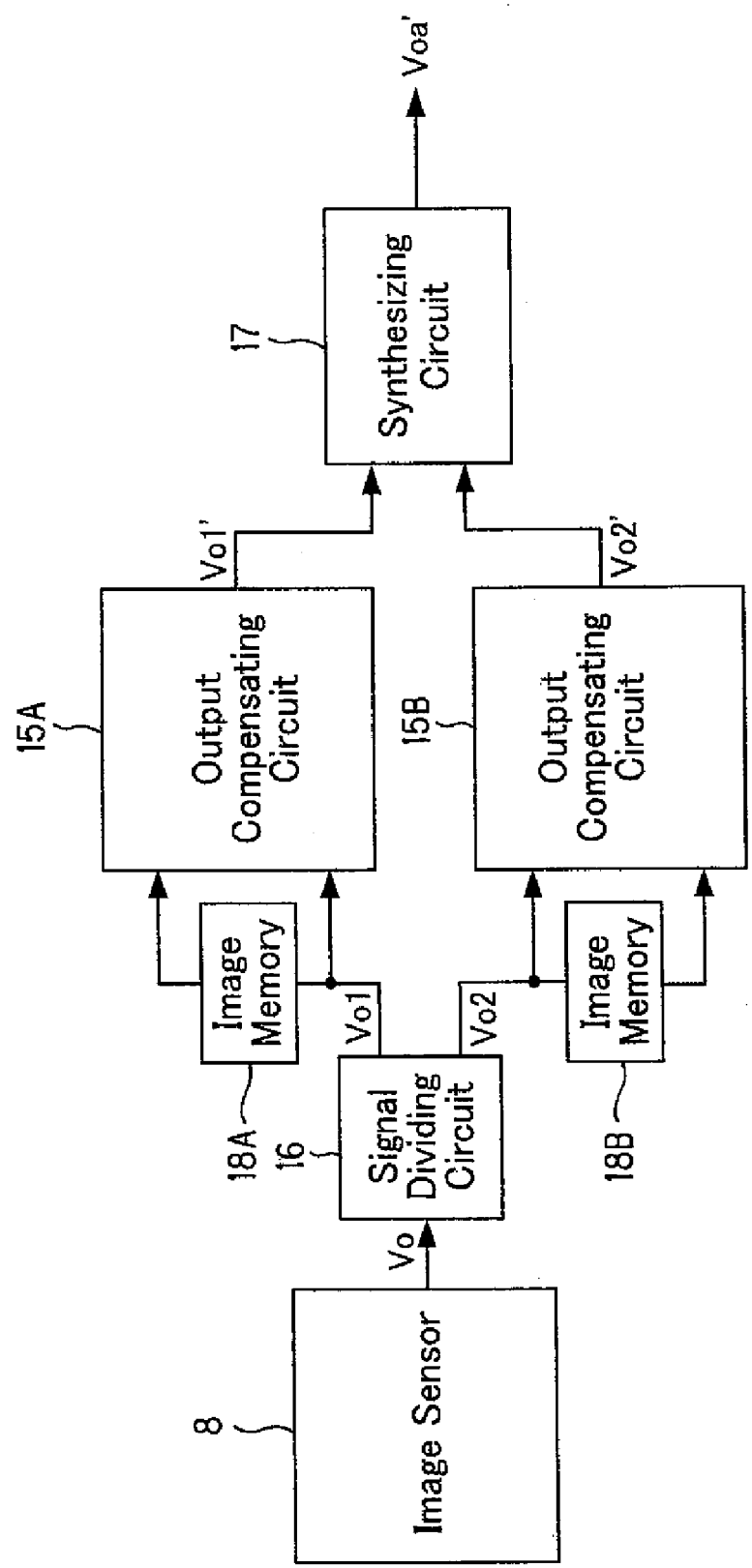
FIG. 19 is a block construction diagram of an output compensating device for an image sensor according to another embodiment of the present invention.

FIG. 19 shows a construction of an image sensor output compensating device according to another embodiment of the present invention, which is capable of dividing the output width VW of sensor (pixel) signals as shown in FIG. 14 and conducting the offset and gain compensation of each of the divided signals respectively. In this embodiment, one of two divisions (divided signals Vo2 in this instance) is temporally stored on the memory 18B, which is offset and gain compensated by the output compensating device 15B similar in construction to the device shown in FIG. 13.

Figure 16:
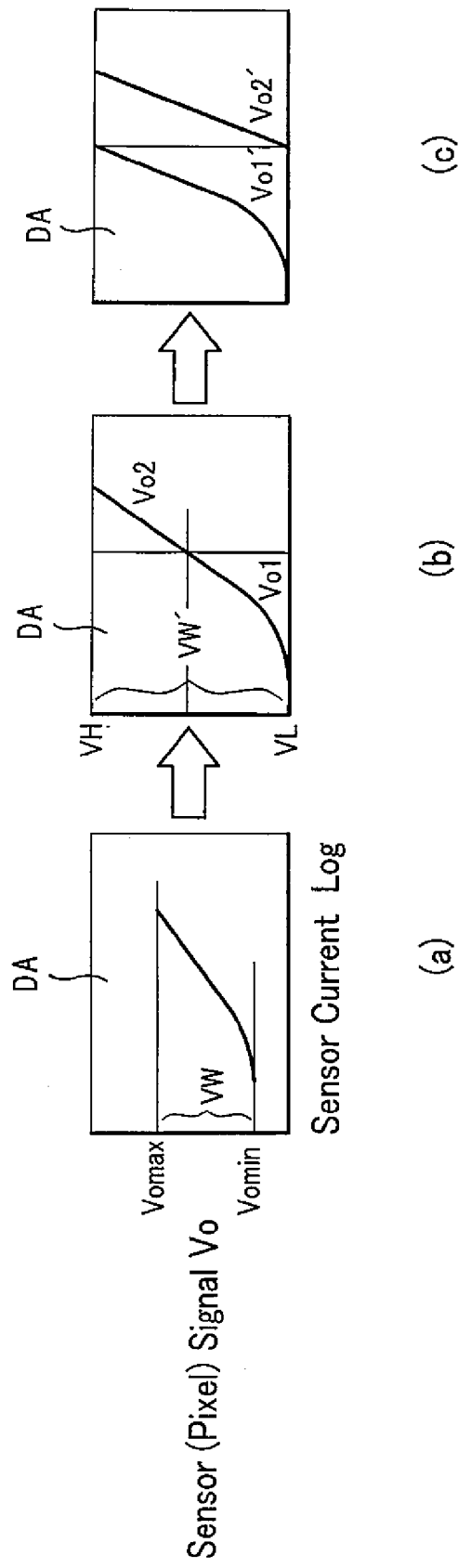
FIG. 16 is another example of processing states of a sensor output signal when correcting each of divisions of an output range of signals from an image sensor to cover an entire screen area of a display device.
Figure 20:
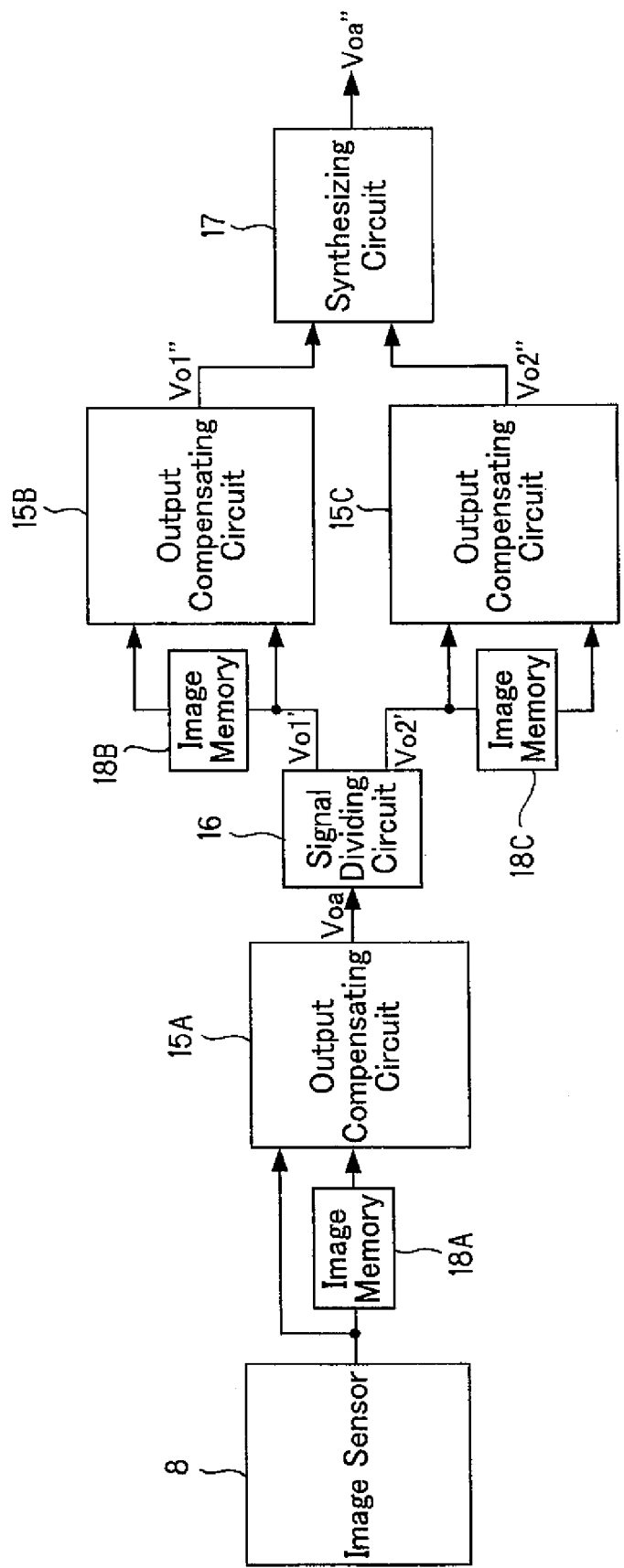
FIG. 20 is a block construction diagram of an output compensating device for an image sensor according to another embodiment of the present invention.

FIG. 20 shows a construction of an image sensor output compensating device according to another embodiment of the present invention, which first conducts the offset and gain compensation of senor (pixel) signals as shown in FIG. 16, divides the output width VW' of compensated sensor signals and conducting the offset and gain compensation of each of the divided signals respectively. In this embodiment, sensor (pixel) signals Vo output from the image sensor 8 are stored on an image memory 18A and then read out and input to an output compensating device 15A similar in construction to the device shown in FIG. 18, which performs the offset and gain compensation of respective signals. The compensated sensor signals Voa are divided in two portions respectively by a signal dividing circuit 16 using a specified threshold Vs'. Divided signals VoI', which are portions of the divided compensated signals, are first stored on an image memory 18B and then read out to be finally compensated for offset and gain by an output compensating device 15B which is similar in construction to that of FIG. 18. Divided signals Vo2', which are other portions of the divided compensated signals, are first stored on an image memory 18C and then read out to be finally compensated for offset and gain by an output compensating device 15C which is similar in construction to the device of FIG. 18. The compensated divided signals VoI" and Vo2" are combined together to form respective compensated pixel signals composing a finally compensated image by a synthesizing circuit 17.

Since the image sensor comprising a matrix of light sensor (pixel) circuits as shown in FIG. 1 may lose logarithmic output characteristic (in a region WB) at a small quantity of incident light causing insufficient contrast of the image, an output compensating device according to the present invention includes a means for converting the non-logarithmic output characteristic of the non-logarithmic response region WB into logarithmic characteristic to obtain sensor signals having logarithmic characteristics before offset-and-gain compensation.

Figure 21:
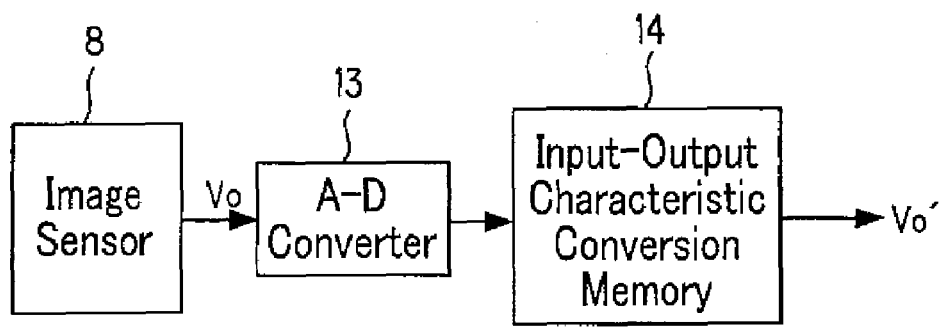
FIG. 21 is a block diagram of an exemplary system of converting a sensor signal output from a light sensor circuit into a signal having a logarithmic output characteristic in an entire range.

The output compensating device is embodied as shown in FIG. 21, wherein respective pixel signals Vo output in a time series from the image sensor 8 are converted into corresponding digital signals by an AD converter 13 and further corrected to have the logarithmic characteristic by using an input-output characteristic conversion table stored on a lookup memory 14. In the table, corrected output values are preset versus digital signals of the non-logarithmic response region.

Figure 22:
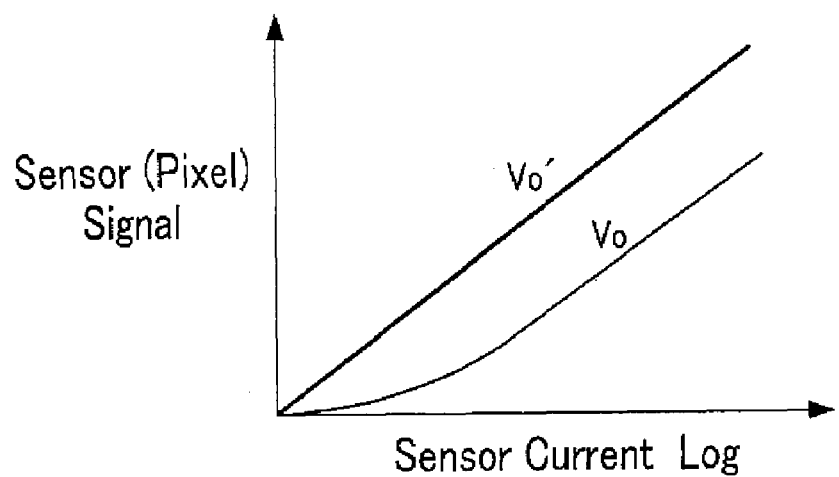
FIG. 22 shows the characteristic of a sensor signal output from a light sensor circuit after conversion into a signal having a logarithmic output characteristic in an entire range.

FIG. 22 shows an entire logarithmic output characteristic of a sensor (pixel) signal Vo' obtained by correcting a non-logarithmic portion of a sensor signal Vo output from a light sensor circuit, i.e., the characteristic curve of the signal Vo' demonstrating an entire logarithmic output characteristic over all the range of low to high luminosity of incident light.

When converting digital data of a non-logarithmic characteristic portion of a sensor signal Vo into digital data of a logarithmic characteristic portion of the signal by using the lookup memory 14, it is possible to divide in advance the digital data into portions each of, for example, one byte (8-bit) if the conversion system is adapted to express 8-bit data.

In this case, each of divided portions of the signal is given an ID under the control of a CPU (not shown), by which it can be identified by the party using the converted signal data. The CPU can also control the system to change the portion to be divided by the request of the user.

Figure 23:
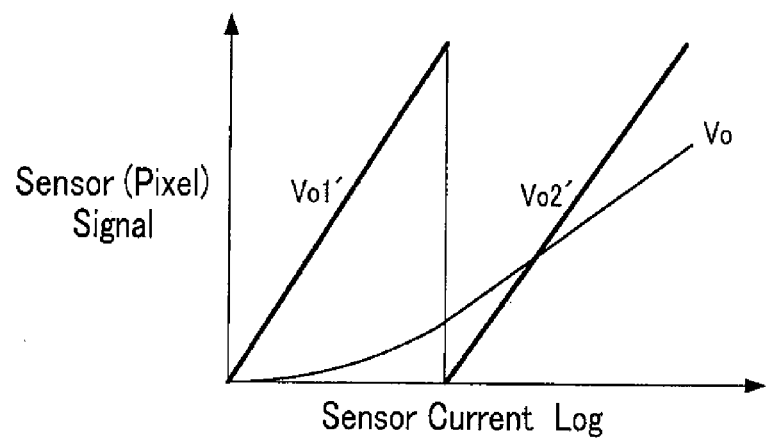
FIG. 23 shows the logarithmic output characteristic of a sensor signal, which was obtained by dividing the signal into two portions at an optional point and converting these potions into logarithmic outputs respectively.

FIG. 23 shows a characteristic curve of a sensor signal Vo output from the light sensor circuit which is divided into two portions by a certain threshold quantity of incident light and converted into two characteristic curves VoI' and Vo2'.

When the output characteristic of a sensor signal Vo was converted into the logarithmic characteristic by increasing the sensitivity of its non-logarithmic response region, the corrected signal has an emphasized noise not contained in the original sensor signal Vo. If the signal was further processed to remove noise components by filtering all of the output range, the sensor signal may suffer decreased contrast.

To avoid the above, the present invention provides such a solution that the sensor signal Vo' is processed by filtering only its logarithmically corrected portion which corresponds to the low luminance output portion of the original signal output from the non-logarithmic response region of the light sensor circuit.

This filtering process can effectively remove a noise component from the sensor signal Vo', which was emphasized when obtaining the logarithmic output characteristic of the signal by increasing the sensitivity of the non-logarithmic response region of the original sensor signal Vo. In other words, since the other portion of the sensor signal, which does not contain any emphasized noise, is not processed by the filter, the processed signal can compose a well contrasted image from which the noise components were effectively removed.

According to the present invention, the filtering process for removing the noise component only from the low-luminance portion of the output sensor signal Vo' selects the characteristic of the filter in accordance with the amplified degree of the signal Vo' corrected for non-logarithmic characteristic output of the non-logarithmic response region of the light sensor circuit, i.e., an amplification coefficient recorded on the input-output characteristic conversion memory 14. The use of a filter having the characteristic adapted to the amplification coefficient recorded on the memory 14 can remove an emphasized noise suitably (not insufficiently and not excessively) from the sensor signal Vo.

Figure 24:
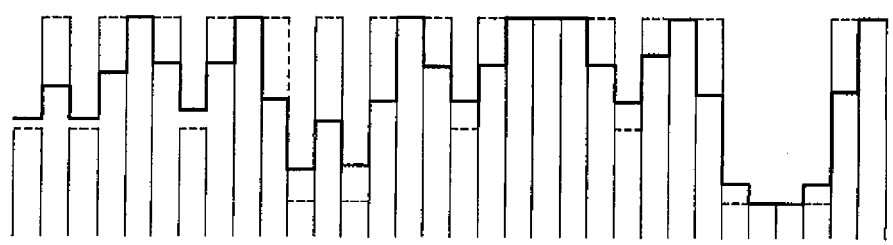
FIG. 24 is illustrative of a discrete state of digitized pixel signals of an image sensor.

If the digitized sensor signal was corrected for non-logarithmic characteristic portion by amplifying with a large amplification coefficient for input-output characteristic conversion, it increases discretion of digital sensor signals of neighboring pixels, decreasing the quality of the output image of the image sensor as shown in FIG. 24. The filtering process can smooth the sensor signals of neighboring pixels, improving the continuous inter-pixel representation of an image composed by the sensor signals.

The filtering process of the present invention provides a wide selection of filters usable for removing common noise components.

Figure 25:
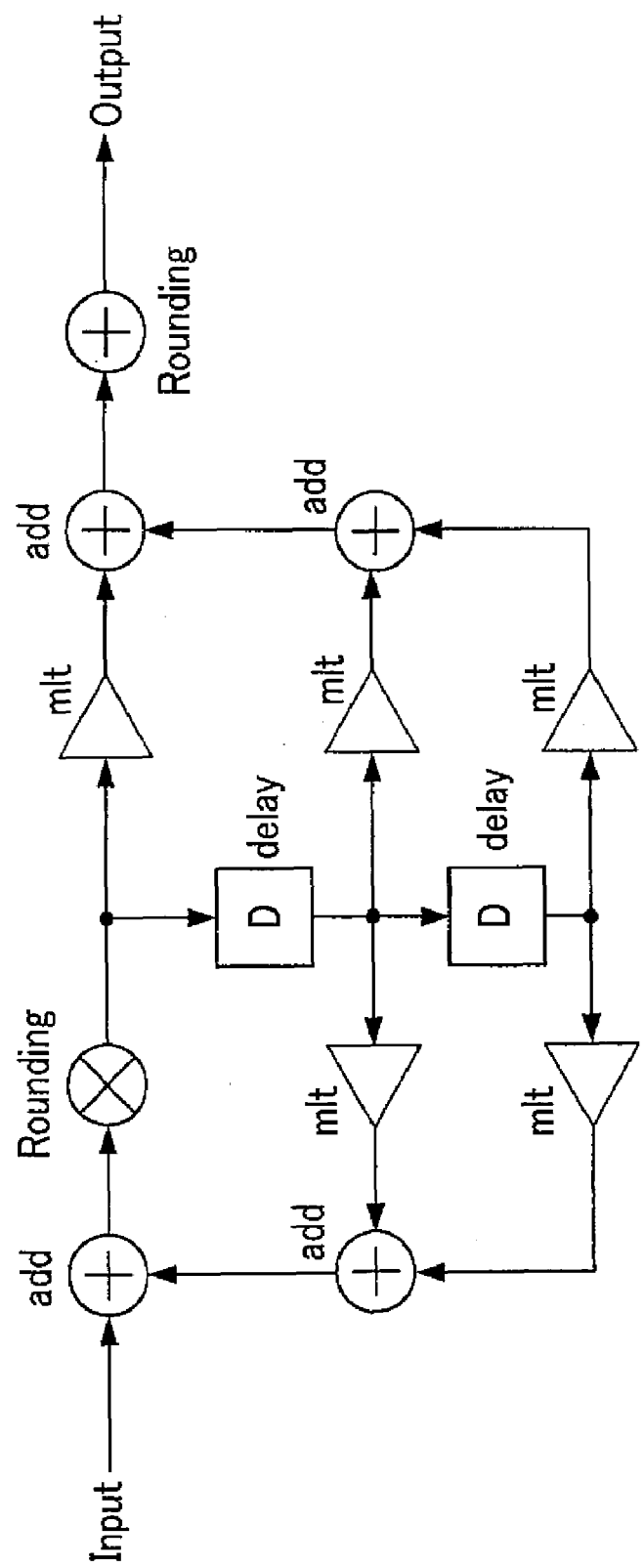
FIG. 25 is an electric circuit diagram of a conventional low-pass filter.

FIG. 25 shows by way of example an IIR low-pass filter. A FIR filter can be also used.

Figure 26:
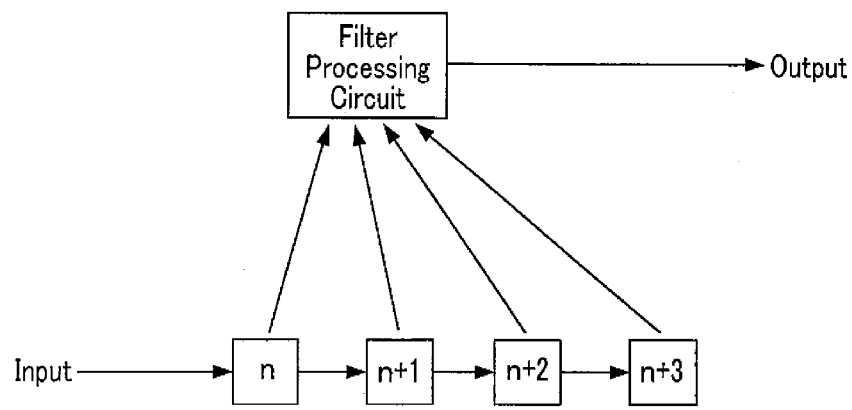
FIG. 26 is a block diagram depicting an exemplary configuration of a filtering process for removing high frequency components by a method of determining an average of outputs of neighboring pixels.

FIG. 26 shows an exemplary filter circuit for removing a high-frequency component by determining an average between outputs of neighboring pixels (by a moving average method). Since the image signals have the continuity, any pixel signal showing an absurd change in comparison with neighbors may be treated as a noise.

Figure 27:
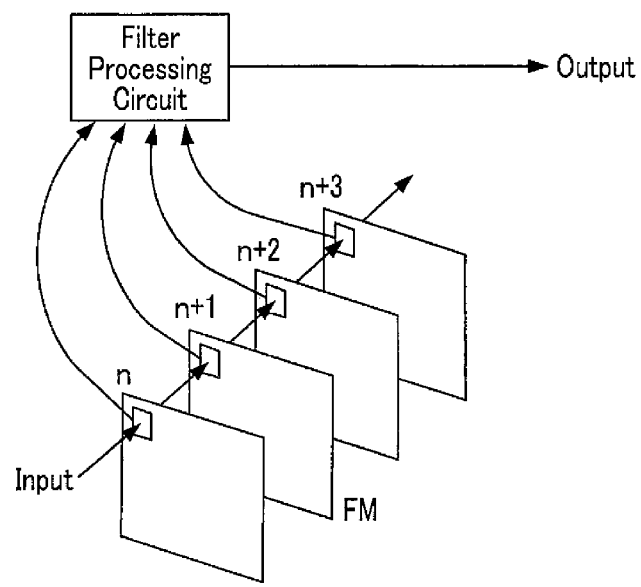
FIG. 27 is a block diagram showing an example of a filtering process for one pixel by using a plurality of frame memories.

FIG. 27 shows a filter circuit using a plurality of frame memories FM, which is capable of filtering outputs at the same positions. It can use filters as shown in FIGS. 25 and 26.

FIGS. 28 to 31 are illustrative of respective configurations of filter circuits for removing noise components from sensor signals Vo' by filtering only pixel signals which were output with non-logarithmic characteristic at low luminance and corrected to have logarithmic output characteristic.

Figure 28:
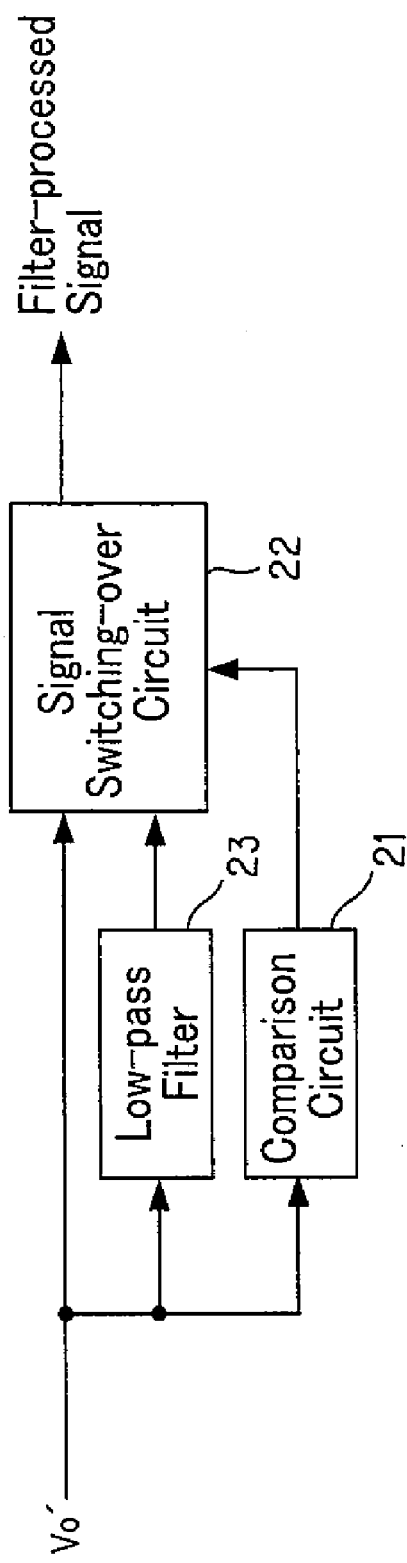
FIG. 28 is a block diagram showing an example of a filtering process of a sensor signal converted into that having a logarithmic characteristic.

The filter circuit shown in FIG. 28 is provided with a comparison circuit 21 containing a signal value serving a reference value preset for selecting sensor signals Vo' processed in advance by input-output conversion, a low-pass filter 23 for processing only the conversion processed signals Vo' and a signal selector circuit 22 for selectively outputting the filter-processed sensor signals Vo' and the other sensor signals requiring no processing by conversion and filtering.

Figure 29:
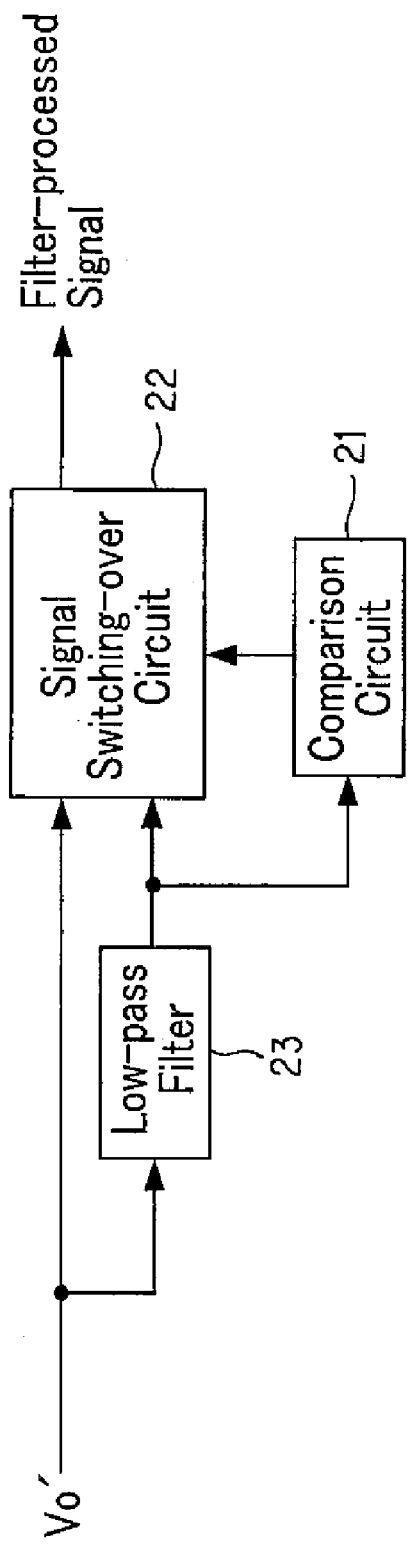
FIG. 29 is a block diagram showing another example of a filtering process of a sensor signal converted into that having a logarithmic characteristic.

The filter circuit shown in FIG. 29 switches over signals by comparing a value of a signal processed by low-pass filter 23 with a reference value preset in the comparison circuit 21.

Figure 30:
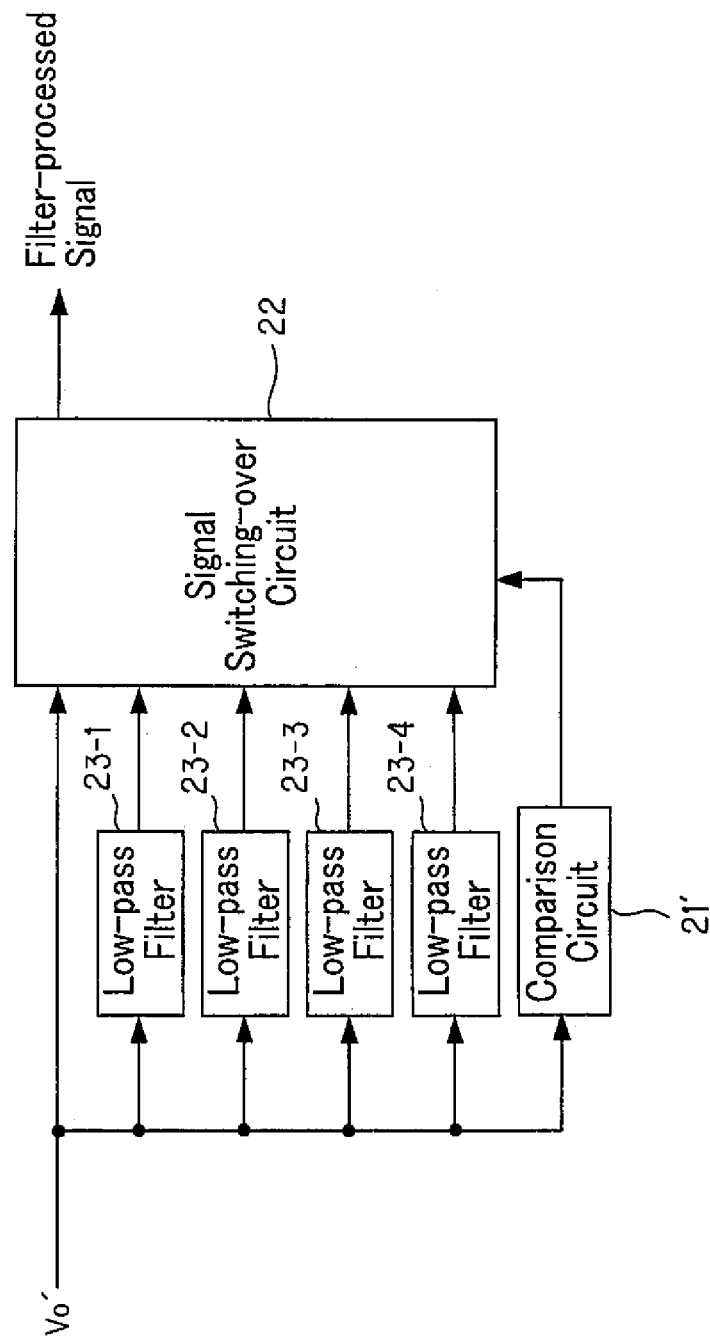
FIG. 30 is a block diagram depicting a filtering process of a sensor signal converted into that having a logarithmic characteristic by changing filtering characteristics.
Figure 31:
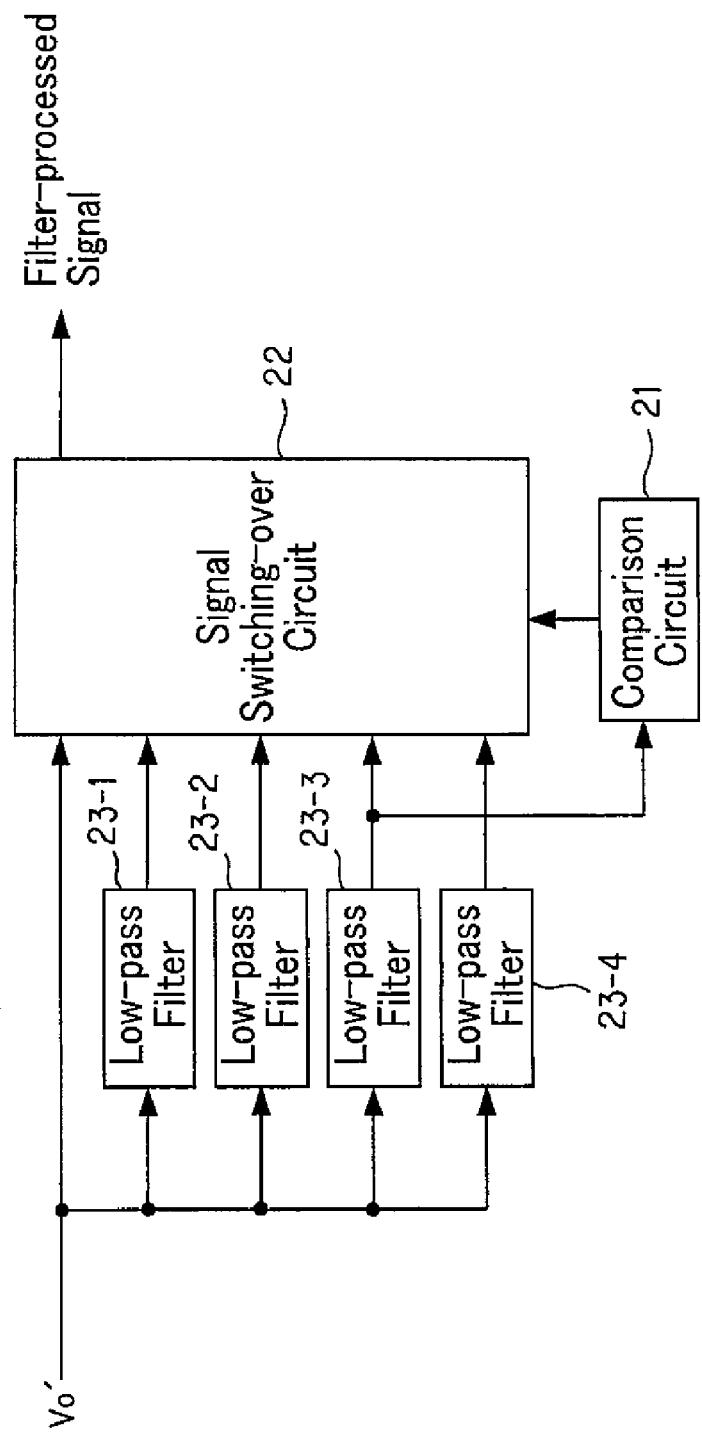
FIG. 31 is a block diagram showing another example of a filtering process of a sensor signal converted into that having a logarithmic characteristic by changing filtering characteristics.

The filter circuits shown in FIGS. 30 and 31 are capable of filtering only sensor signals Vo' which were output at a small quantity of incident light and converted into signals having the logarithmic characteristic by changing the characteristic of the filter in accordance with the input-output characteristic conversion coefficient.

The filter circuit shown in FIG. 30 compares a sensor signal with a plurality of preset values in a comparison circuit 21' and processes the signal by a plurality of low-pass filters 23-1 to 23-4 having different characteristics and selectively outputs one of the filter-processed signals.

The filter circuit shown in FIG. 31 includes a plurality of low-pass filters 23-1 to 23-4 having different characteristics and compares a sensor signal processed by a particular filter, for example, 23-3 with a preset value in a comparison circuit 21 and selectively outputs one of the filter-processed signals.

Although the filter circuits of FIGS. 30 and 31 are designed to selectively output one of sensor.signals processed by a plurality of low-pass filters, there may be a modification which uses only one filter 23 by changing a constant of the characteristic.

Figure 32:
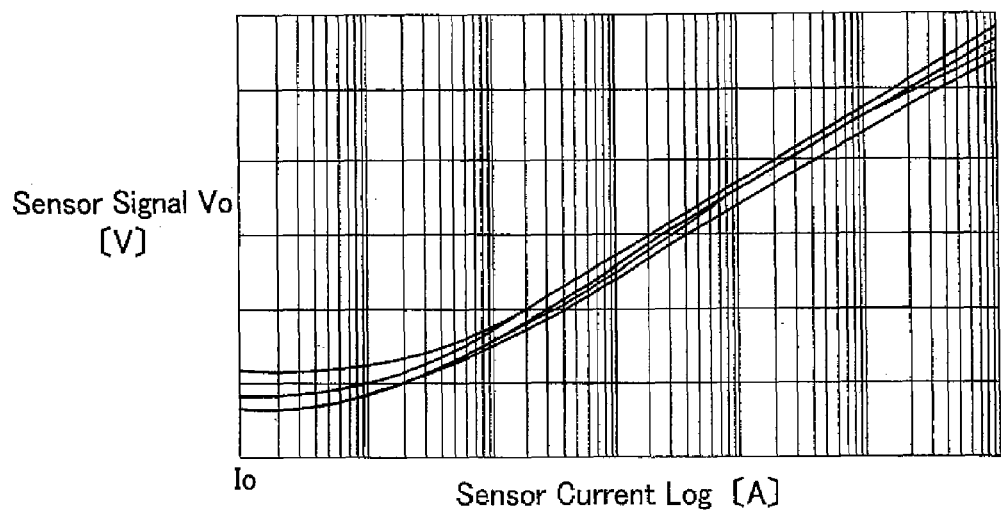
FIG. 32 shows an example of variations in output characteristics of pixel signals output from an image sensor.

Although the above description was made with an assumption that the image sensor is composed of the light sensor circuits having the same output characteristics, the image sensor cannot be free from structure-derived variations in output characteristics as shown in FIG. 32 of respective pixel sensor circuits shown in FIG. 1, which variations must be compensated by the output compensating device according o the present invention. In FIG. 32, Io designates a sensor current corresponding to a dark current flowing in a photodiode of a light sensor circuit with no illumination.

Variations in output characteristics of respective light sensor circuits each representing a unit pixel are derived mainly from differences between sub-threshold values of the transistors Q1 of the light sensor circuits which generate voltage signals Vpd corresponding to the quality of light falling on the respective light sensor circuits. The variations in output characteristics of the respective light sensor circuits are also caused from variations in characteristics of transistors Q2 for amplifying the logarithmically converted voltage signals of respective pixels with high impedance.

Output compensating means for compensating for variations in output characteristics of respective light sensor circuits have been proposed by the present applicant (Japanese Laid-Open Patent Publications No. 2000-404931, 2000-404933, 2001-75035 and 2001-75036).

According to the present invention, the sensor (pixel) signals Vo output in a time series from the respective light sensor circuits of an image sensor are characteristics and then offset- and gain-compensated as described before. Alternatively, respective sensor (pixel) signals compensated first for variations in output characteristics are converted to signals Vo' having full logarithmic output characteristics, which are then offset- and gain-compensated.

Figure 33:
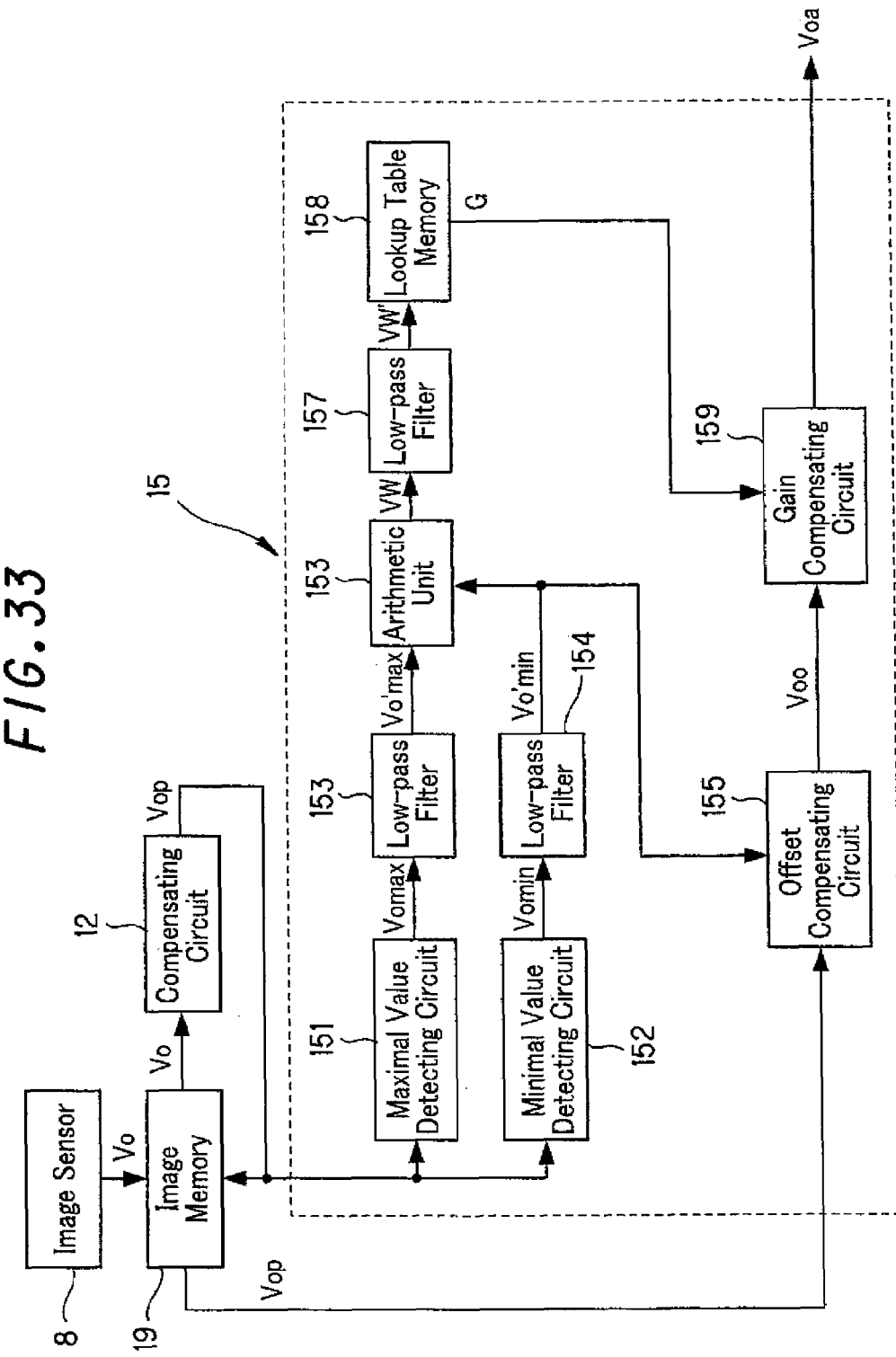
FIG. 33 is a block diagram of an embodiment of the present invention for compensating for variations of output characteristics of pixel signals output from an image sensor.

FIG. 33 illustrates a practical configuration of an image sensor output compensating device capable of conducting the above-described compensation of the respective pixel signals output in a time series from respective light sensor circuits of an image sensor. In the shown system, an image signal composed of pixel signals Vo output in a time series from respective light sensor circuits of an image sensor 8 is temporally stored on an image memory 19 and then read out from the memory 19 and transferred to a compensating circuit 12 wherein respective pixel signals Vo are compensated for variations in output characteristics of the respective light sensor circuits. The sensor signals Vop compensated for variations in output characteristics are stored again on the image memory 19 and at the same time input to a maximal value detecting circuit 151 and a minimal value detecting circuit 152 respectively. The sensor (pixel) signals Vop for one image are then readout from the image memory 19 at specified timing pulses and input to an output compensating device 15 wherein they are subjected to offset and gain compensation as described before.

Since the respective sensor signals Vop corrected by the compensating circuit 12 are directly given to the output compensating device 15 for determining the maximal value and minimal value and the same signals Vop temporally stored on the image memory are readout at specified timing and input to the output compensating device 15 which can therefore conduct the offset and gain compensation of the signals Vop in real time without delay in response.

The provision of the image memory 19 temporally storing an image signal composed of respective sensor signals Vo output in a time series from the image sensor 8 enables the image sensor output compensating device to work in connection with any external device even in the case that the image sensor scanning clock is different from the video signal clock required by the external device.

Figure 34:
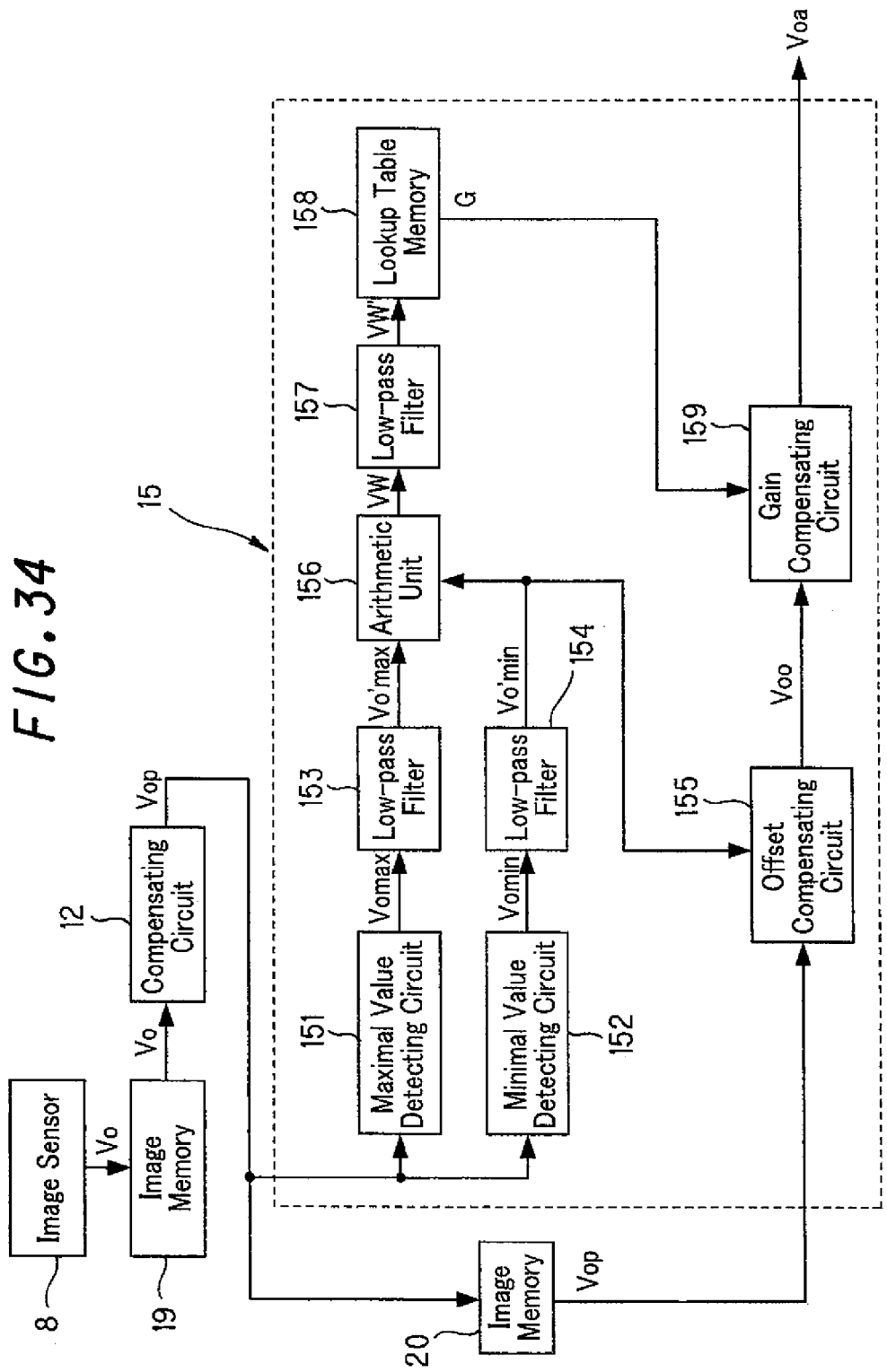
FIG. 34 is a block diagram of another embodiment of the present invention for compensating for variations of output characteristics of pixel signals output from an image sensor.

FIG. 34 illustrates another exemplary configuration of an image sensor output compensating device according to the present invention. In the shown system, an image signal composed of pixel signals Vo output in a time series from respective light sensor circuits of an image sensor 8 is temporally stored on a first image memory 19 and then read out from the memory 19 and input to a compensating circuit 12 wherein respective pixel signals Vo are compensated for variations in output characteristics of the respective light sensor circuits. The sensor signals Vop compensated for variations in output characteristics are stored on a second image memory 20 and at the same time input to a maximal value detecting circuit 151 and a minimal value detecting circuit 152, respectively, of an output compensating device 15. The sensor signals Vop are then readout from the image memory 20 at specified timing pulses and input to the output compensating device 15 wherein they are subjected to offset and gain compensation as described before.

Figure 35:
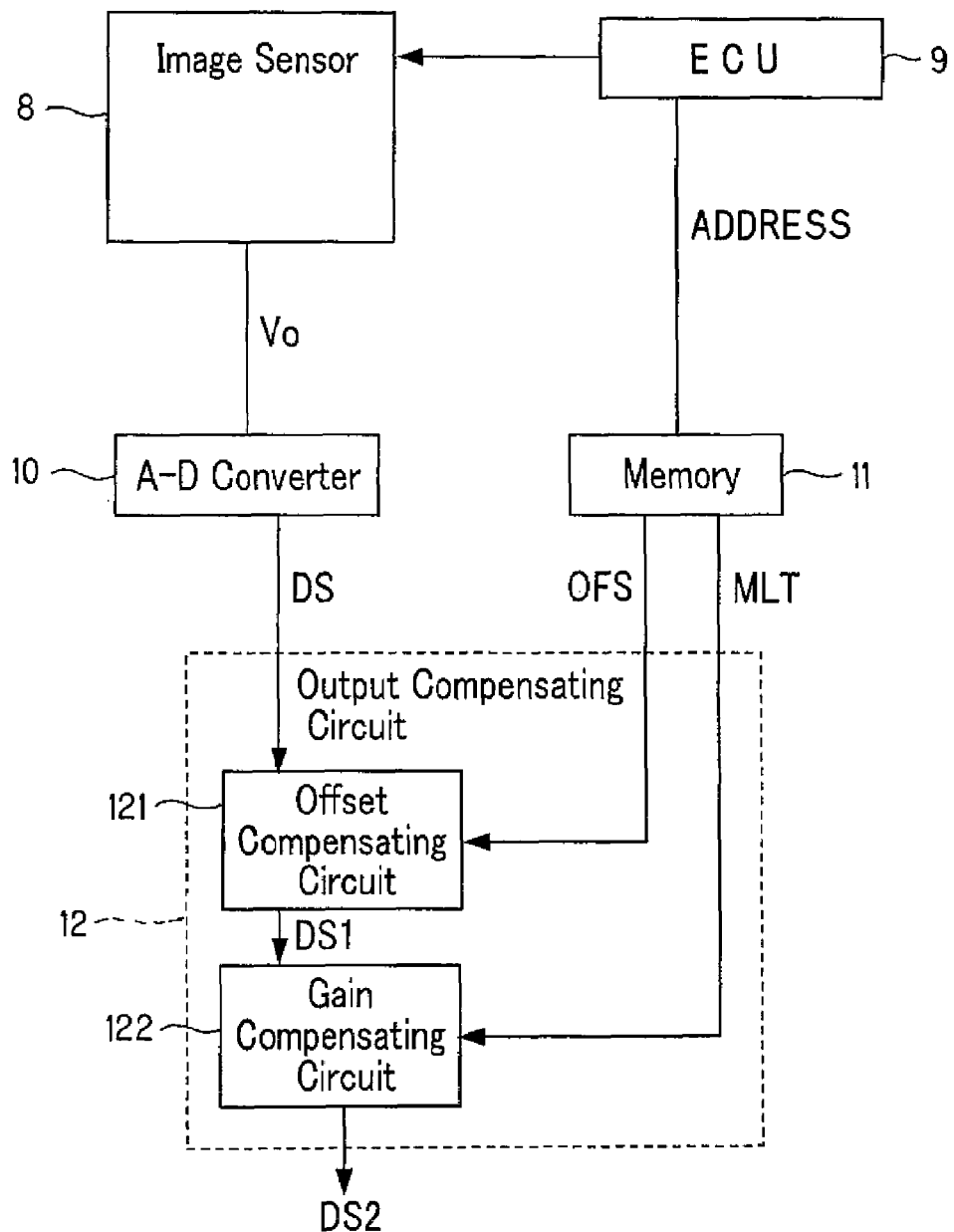
FIG. 35 is a block construction diagram of a system for compensating for variations of output characteristics of pixel signals of an image sensor.

FIG. 35 illustrates a practical configuration of an image sensor output compensating system for conducting compensation for variations in output characteristics of pixel signals output from respective light sensor circuits of an image sensor. This system comprises an image sensor 8, an electronic control unit ECU 9 for performing the control of reading pixel signals Vo from respective pixel circuits in a time series, an A-D converter 10 for converting pixel signals Vo output in a time series from the image sensor 8 into corresponding digital signals, a memory 11 for storing offset compensation values OFS predetermined for output characteristics of respective pixels (light sensor circuits) and multipliers MLT for gain compensation, both of which can be selected in accordance with an address signal ADDRESS (X, Y) of a pixel to be processed, which address signal is given by the ECU 9, and an output compensating circuit 12 for performing arithmetic operations necessary for the offset compensation and gain compensation of the digitized pixel signal using a corresponding offset compensation value OFS and multiplier MLT read from the memory 11.

Respective pixel signals Vo output in a time series from the image sensor are outputs in a dark state when the gate voltage VG of each transistor Q1 for each pixel is switched to a value higher than a normal value used for taking a picture and outputs in a bright state when the gate voltage VG and the drain voltage VD of each transistor Q2 for each pixel is changed to a value lower than the normal value.

Figure 37:
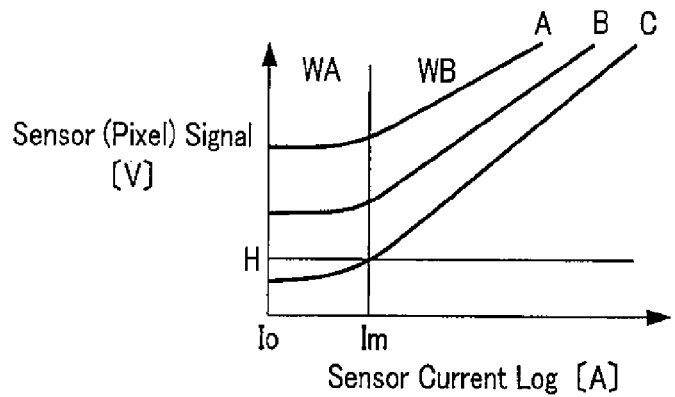
FIG. 37 shows an example of variations in output characteristics of pixel signals, which were derived from the structure of respective pixel (sensor) circuits of an image sensor.

FIG. 37 shows an example of different output characteristics of three pixel signals A, B and C, which differences were caused from the structure-derived variations in the output characteristics of corresponding light sensor circuits. In the shown example, a sensor current value Im corresponding to a threshold H of a pixel output represents a point at which characteristics of pixel signals A, B and C change from a non-logarithmic response region to a logarithmic response region. Io designates a dark current in a sensor circuit when it is not illuminated.

Figure 38:
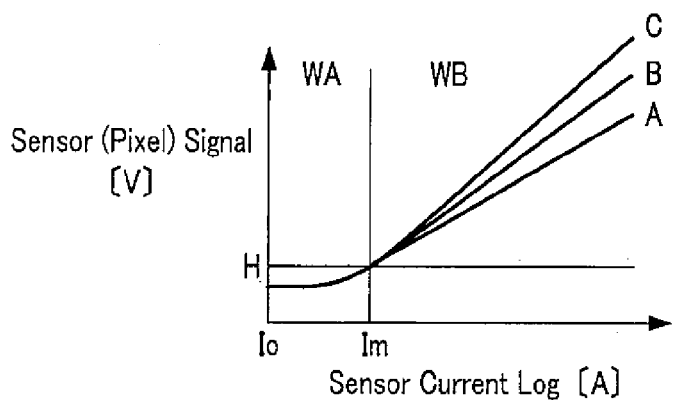
FIG. 38 shows output characteristics of pixel signals, which were obtained by offset compensation of the signals having the output characteristic variations shown in FIG. 37.

In FIG. 38, there is shown a case of conducting the compensation of outputs of the image sensor when the output characteristics of respective pixel signals have the same shape in the non-logarithmic response region WA but they have different gradients in the logarithmic response region WB. Parameters for each pixel signal are information about the point at which its characteristic changes from the non-logarithmic response region WA to the logarithmic response region WB and a pixel output appearing at a dark sensor current.

Figure 36:
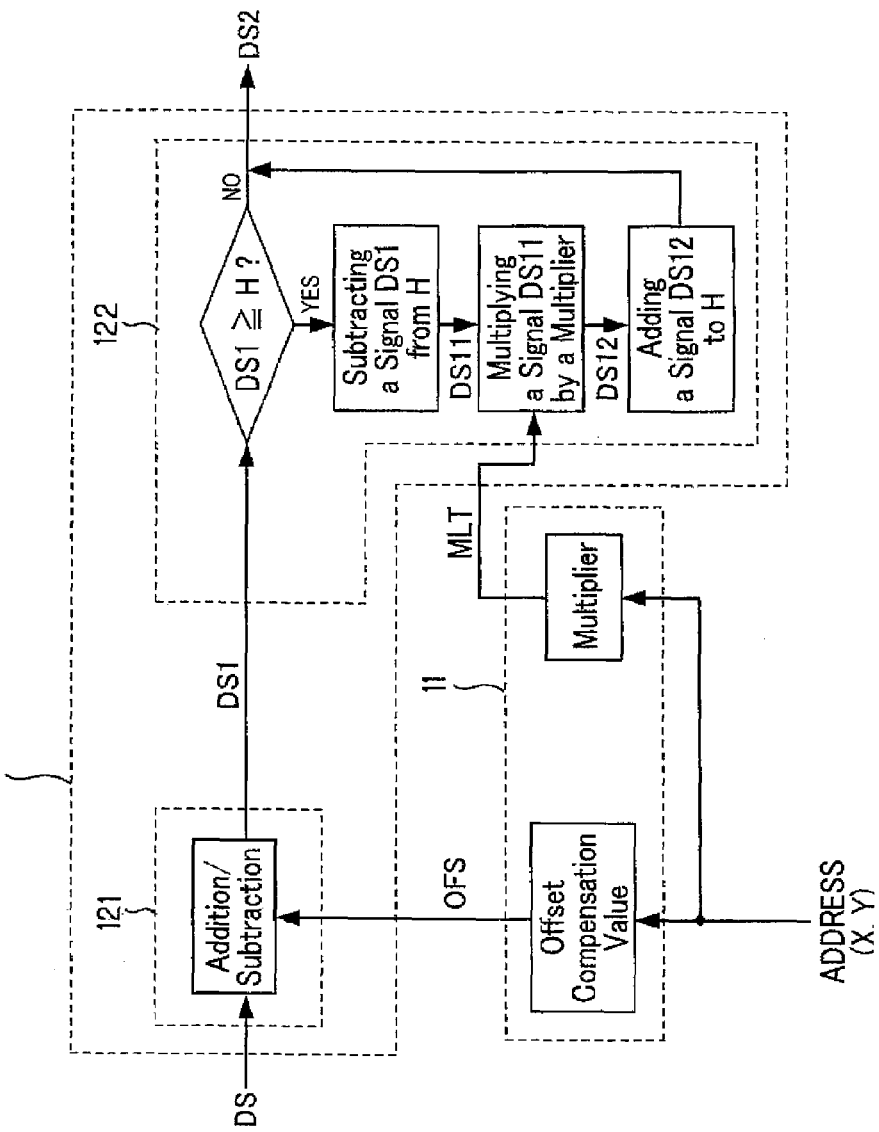
FIG. 36 is an exemplary flowchart depicting the operation of an output compensating circuit of an output compensating device shown in FIG. 35.

FIG. 36 illustrates the operation of the output compensating circuit 12.

In the memory 11, there is a table of offset compensation values OFS for correcting outputs of respective pixel signals so as to attain a value H at a sensor current of Im. In an offset compensating portion 121, the digitized pixel signals DS are corrected by arithmetic operations (addition, subtraction) using corresponding offset compensation values OFS. As the result of the offset compensation, three pixel signals (A, B and C) have the same characteristic in the non-logarithmic response region WA as shown in FIG. 38.

In a gain compensating portion 122, the gain compensation of output characteristics of three pixel signals in the logarithmic response region WB above the threshold value H is conducted by arithmetic operations (multiplication) using corresponding multipliers based on the offset-compensated signals DS1.

In practice, the offset-compensated pixel signal DS1 is checked whether it is larger than the threshold value H and, if so (i.e., the signal is in the logarithmic region WB), it is further subjected to gain compensation by the following arithmetic operations using a specified multiplier MLT selected from the memory 10.

Output←H+(Pixel Signal DS1−H)×Multiplier

A result signal is output as an output-compensated pixel signal DS2.

Figure 39:
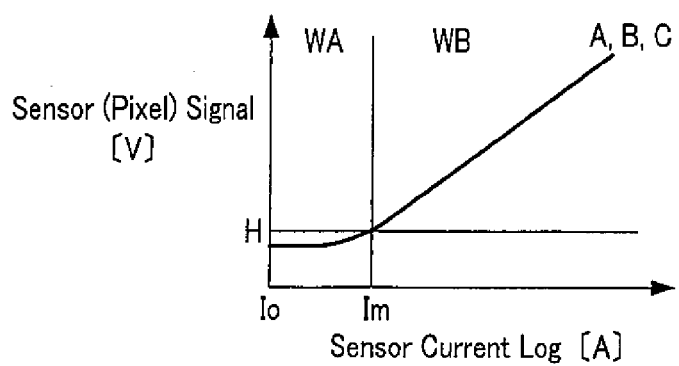
FIG. 39 shows output characteristics of pixel signals, which were obtained by offset compensation and gain compensation for variations in output characteristics of the signals shown in FIG. 37.

As the result of the above-described gain compensation, three pixel signals A, B and C have the same characteristics in the logarithmic response region WB as shown in FIG. 39. In this instance, the offset-compensated pixel signal DS1 being smaller than the threshold value (i.e., in the non-logarithmic response region WA) is directly output as an output-compensated digital pixel signal DS2.

Figure 41:
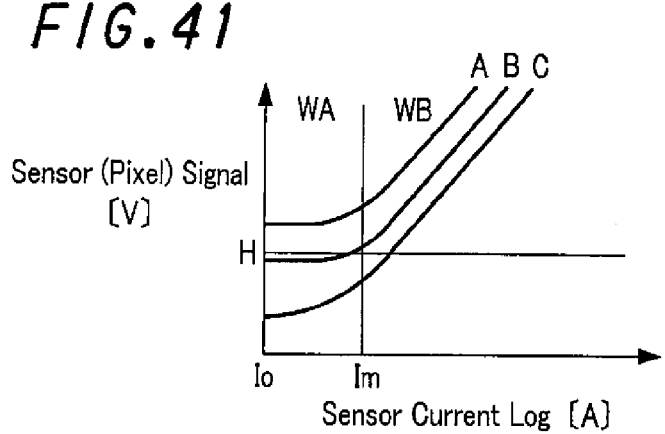
FIG. 41 shows another example of variations in output characteristics of pixel signals from an image sensor, which were derived from the structure of respective pixel circuits of an image sensor.

FIG. 41 shows another example of different output characteristics of three pixel signals A, B and C, which differences were caused from the structure-derived variations in the output characteristics of corresponding light sensor circuits. This is a case of conducting the compensation of outputs of the image sensor when the output characteristics of respective pixel signals have the same gradient in the logarithmic response region WB but they are different in shape from each other in the non-logarithmic response region WA.

Figure 40:
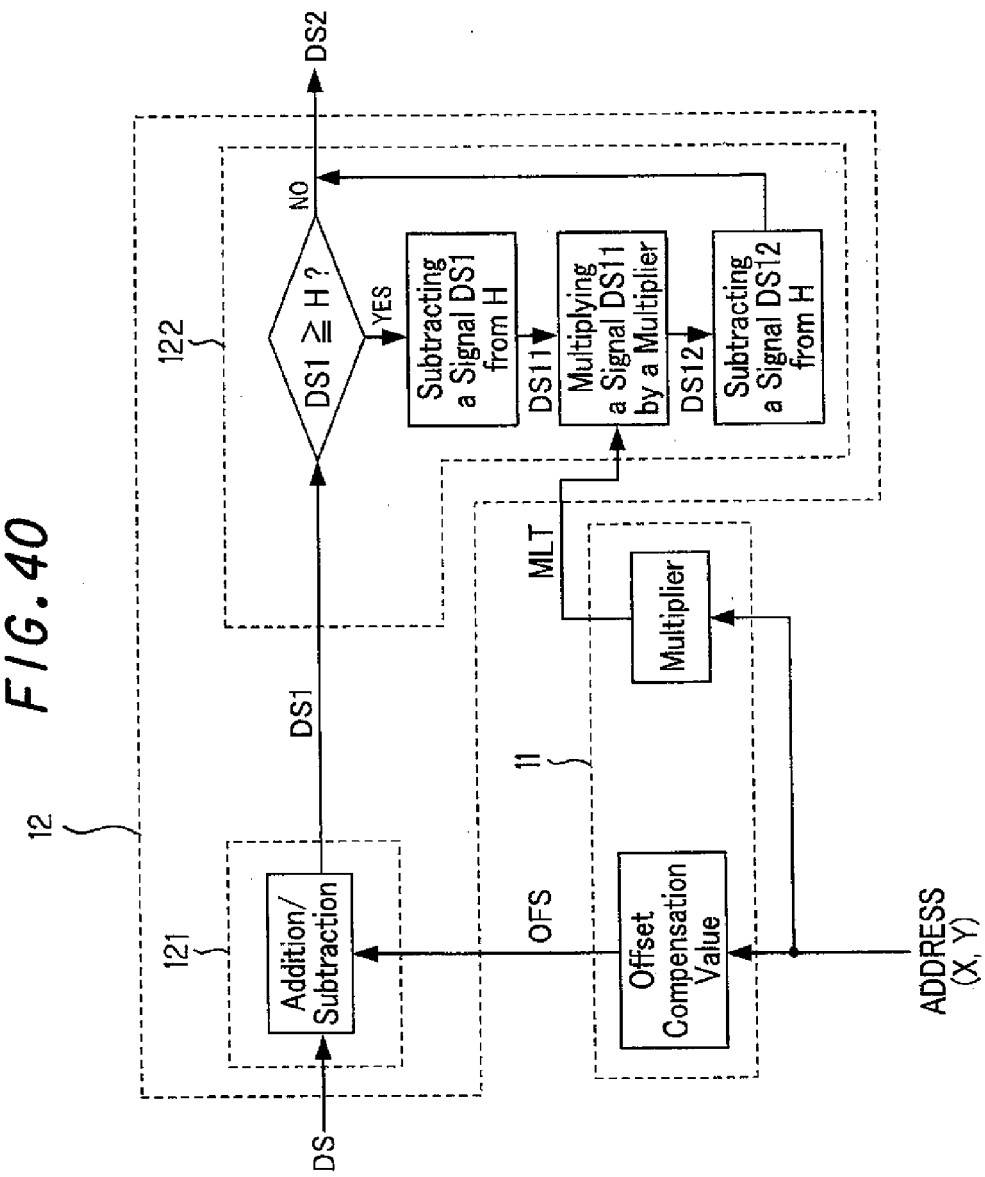
FIG. 40 is another exemplary flowchart depicting the operation of an output compensation circuit shown in FIG. 35.

FIG. 40 illustrates the operation of the output compensating circuit 12.

Figure 42:
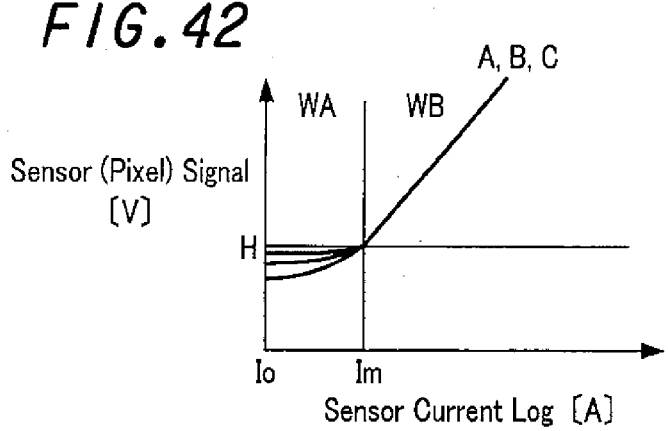
FIG. 42 shows output pixel signal characteristics obtained by offset compensation for variations in output characteristics of the signals shown in FIG. 41.

In the memory 11, there is a table of offset compensation values OFS for correcting outputs of respective pixel signals so as to attain a value H at a sensor current of Im. In an offset compensating portion 121, the digitized pixel signals DS are corrected by arithmetic operations (addition, subtraction) using corresponding offset compensation values OFS. As the result of the offset compensation, three pixel signals (A, B and C) have the same characteristic in the logarithmic response region WB as shown in FIG. 42.

In a gain compensating portion 122, the gain compensation of output characteristics of three pixel signals in the non-logarithmic response region WA below the threshold value H is conducted by arithmetic operations (multiplication) using corresponding multipliers based on the offset-compensated signals DS1.

In practice, the offset-compensated pixel signal DS1 is checked whether it is smaller than the threshold value H and, if so (i.e., the signal is in the non-logarithmic region WA), it is further subjected to gain compensation by the following arithmetic operations using a specified multiplier MLT selected from the memory 10.

Output←H−(H−Pixel Signal DS1)×Multiplier

A result signal is output as an output-compensated pixel signal DS2.

Figure 43:
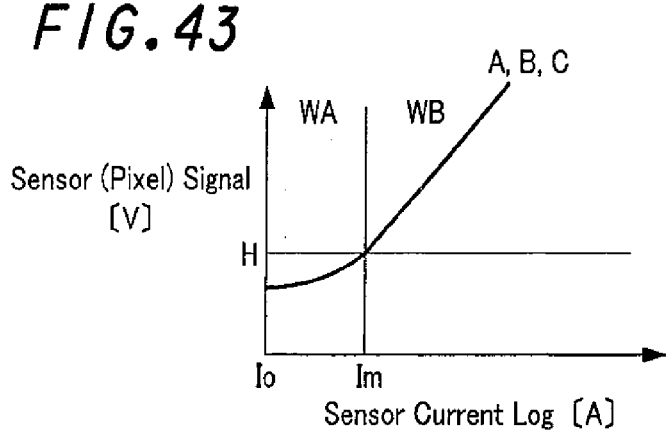
FIG. 43 shows output characteristics of pixel signals obtained by offset compensation and gain compensation for variations in output characteristics of the signals shown in FIG. 41.

As the result of the above-described gain compensation, three pixel signals A, B and C have the same characteristics in the non-logarithmic response region WA as shown in FIG. 43. In this instance, the offset-compensated pixel signal DS1 being larger than the threshold value (i.e., in the logarithmic response region WB) is directly output as an output-compensated pixel signal DS2.

Figure 45:
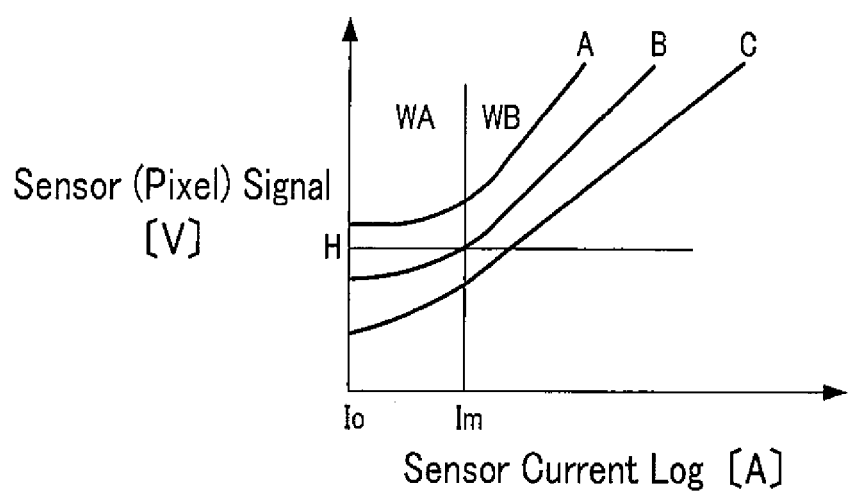
FIG. 45 shows another example of variations in output characteristics of pixel signals from an image sensor, which were derived from the structure of respective pixel circuits of an image sensor.

FIG. 45 shows a further example of different output characteristics of three pixel signals A, B and C, which differences were caused from the structure-derived variations in the output characteristics of corresponding light sensor circuits. The compensation of outputs of the image sensor is conducted when the output characteristics of respective pixel signals have the different gradients in the logarithmic response region WB and they are different in shape from each other in the non-logarithmic response region WA.

Figure 44:
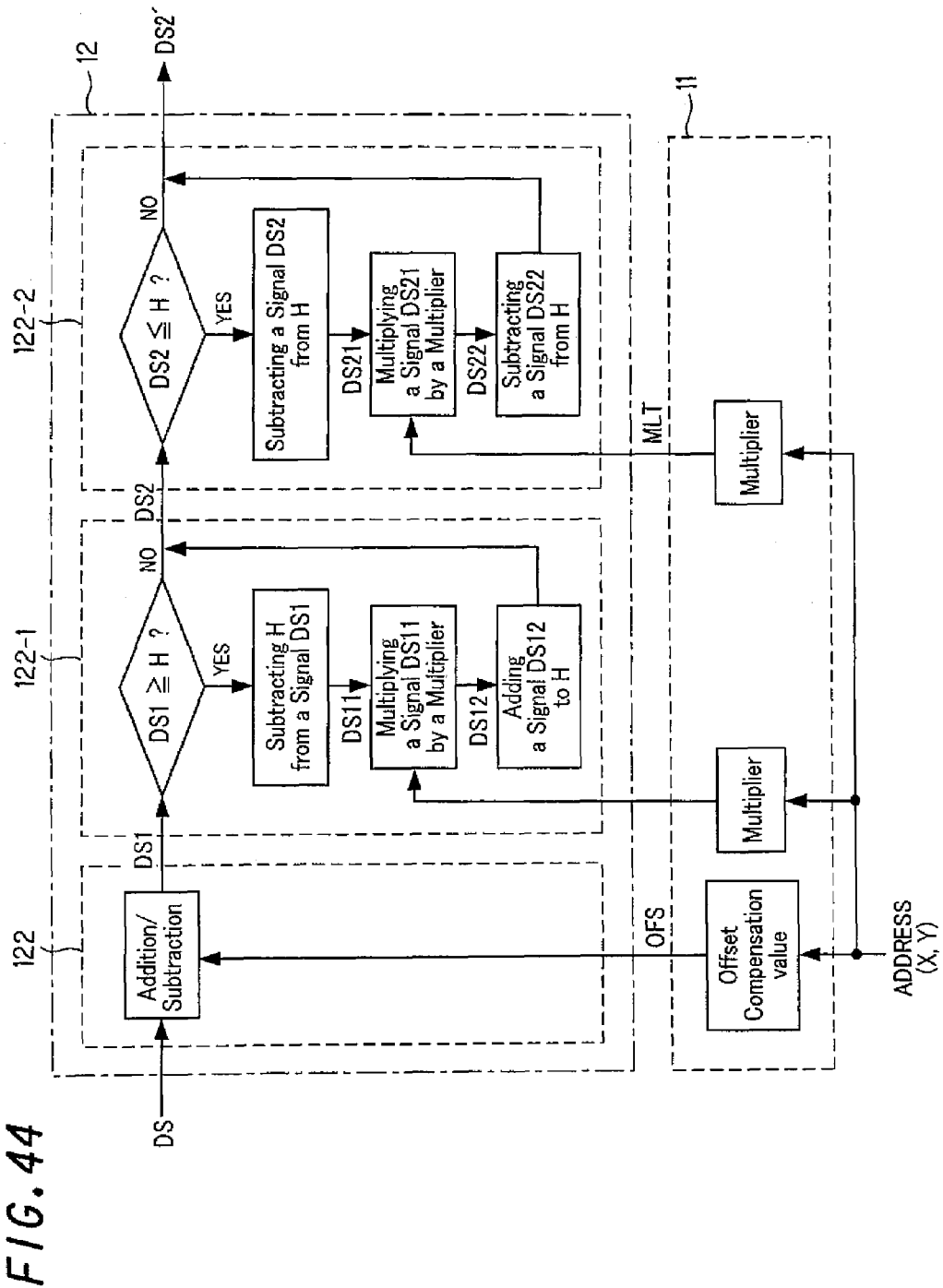
FIG. 44 is another exemplary flowchart depicting the operation of an output compensation circuit shown in FIG. 35.

In this instance, the respective sensor signals A, B and C are offset-compensated and gain-compensated by applying a combination of processing operations indicated in FIGS. 36 and 40 as shown in the operation flow chart of the output compensating circuit 12 of FIG. 44. Sensor signals DS2' are finally obtained, which have the same output characteristics both in the non-logarithmic response region and the logarithmic response region.

INDUSTRIAL APPLICABILITY OF THE INVENTION

An image sensor output compensating device according to an aspect of the present invention is capable of effectively correcting pixel signals composing an image taken and output by the image sensor having a wide dynamic range so as to be adaptively displayed on a viewable screen area of a display by using a means for detecting a minimal value and a maximal value of sensor (pixel) signals output from respective light sensor circuits of the image sensor to be displayed on a display screen area, a means for offsetting the detected minimal value of the sensor signal to a lower limit value of the display screen area and a means for adjusting a gain of the sensor signals to bring an output width determined by the, detected minimal value and the detected maximal value of the sensor signals to the maximal width or a specified width of the viewable screen area of the display, wherein the gain adjustment of the sensor signal is conducted by using a memory storing a table of preset gain-compensation characteristic values corresponding to output width values of sensor signals. In particular, the provision of a means for temporally storing on an image memory pixel signals output in a time series from the image sensor enables the output compensating device to correct an image taken by the image sensor to be adaptively displayed on a viewable display screen area with no delay in response.

An image sensor output compensating device according to another aspect of the present invention is capable of working with an image sensor composed of light sensor circuits each representing a unit pixel and each producing in a photoelectric converting element a sensor current proportional to a quantity of light falling thereon and converting the current into a voltage signal by a transistor with a logarithmic output characteristic in a weak inverse state and outputting a sensor signal corresponding to the converted voltage and each removing a charge accumulated in a parasitic capacity of the photoelectric converting element by changing a drain voltage of the transistor to a value lower than a normal value to initialize each pixel before detecting a light signal, and is also capable of restoring the logarithmic output characteristics of respective pixel sensor circuits, which is lost when initializing the circuits with a decreased quantity of illumination, by using a means for converting the output characteristic of each pixel signal output in non-logarithmic response region into the logarithmic characteristic to attain a high-quality and well-contrasted image even with decreased illumination. The provision of a filter processing means for removing noise components from signals converted to have the logarithmic output characteristics enables the output compensating device to effectively remove noise components emphasized when processing the signals, thus obtaining a high-quality and well-contrasted image to be displayed on a display screen.

What is claimed is:

1. An output compensating device for an image sensor, comprising a means for detecting a minimal value and a maximal value of sensor (pixel) signals composing an image taken and output by the image sensor to be displayed on a viewable screen area of a display, a means for offsetting respective sensor signals to set the detected minimal value of the corresponding sensor signal to a lower limit value of the display screen area and a means for adjusting a gain of the sensor signal to make an output width determined by the detected minimal value and the detected maximal value of the sensor signals equal to the maximal width or a specified width of the viewable screen area of the display, wherein the gain adjustment of the sensor signal is conducted by using a memory storing a table of preset gain-compensation characteristic values corresponding to output width values of sensor signals.

2. An output compensating device for an image sensor, comprising a means for temporally storing sensor (pixel) signals output successively from the image sensor on an image memory, a means for detecting a minimal value and a maximal value of sensor signals composing an image taken and output by the image sensor to be displayed on a viewable screen area of a display, a means for offsetting the respective sensor signals to set the detected minimal value of the corresponding sensor signal to a lower limit value of the display screen area and a means for adjusting a gain of respective sensor signals read from the image memory to make an output width determined by the detected minimal value and the detected maximal value of the sensor signals equal to the maximal width or a specified width of the viewable screen area of the display, wherein the gain adjustment of the sensor signal is conducted by using a memory storing a table of preset gain-compensation characteristic values corresponding to output width values of sensor signals.

3. An output compensating device for an image sensor, comprising a means for temporally storing sensor (pixel) signals output successively from the image sensor on an image memory, a means for compensating for variations in output characteristics of respective pixels based on the respective sensor (pixel) signals read from the image memory means, a means for storing again compensated sensor (pixel) signals on the image memory, a means for detecting a minimal value and a maximal value of sensor (pixel) signals composing an image taken and output by the image sensor to be displayed on a viewable screen area of a display, a means for offsetting corresponding restored sensor signals read from the image memory in such a way that the detected minimal value of the senor signal may be equal to a lower limit value of the display screen area, and a means for adjusting a gain of the sensor signal in such away that an output width determined by the detected minimal value and the detected maximal value of the sensor signals may be equal to the maximal width or a specified width of the viewable screen area of the display, wherein the gain adjustment of the sensor signal is conducted by using a memory on which gain-compensation characteristic values corresponding to output width values of sensor signals are stored by a table preset.

4. An output compensating device for an image sensor, comprising a means for temporally storing sensor (pixel) signals output successively from the image sensor on a first image memory, a means for compensating for variations in output characteristics of respective pixels based on the respective sensor signals read from the image memory means, a means for temporally storing the compensated sensor signals on a second image memory, a means for detecting a minimal value and a maximal value of sensor signals composing an image taken and output by the image sensor to be displayed on a viewable screen area of a display, a means for offsetting the respective sensor signals read from the second image memory to set the detected minimal value of the corresponding sensor signal to a lower limit value of the display screen area and a means for adjusting a gain of the respective sensor signals read from second image memory to make an output width determined by the detected minimal value and the detected maximal value of the corresponding sensor signals equal to the maximal width or a specified width of the viewable screen area of the display, wherein the gain adjustment of the sensor signal is conducted by using a memory storing a table of preset gain-compensation characteristic values corresponding to output width values of sensor signals.

5. An output compensating device for an image sensor, comprising a means for detecting a minimal value and a maximal value of sensor (pixel) signals composing an image taken and output by the image sensor to be displayed on a viewable screen area of a display, a means for offsetting the respective sensor signals to set the detected minimal value of the sensor signal to a lower limit value of the display screen area and a means for adjusting a gain of the sensor signal to make an output width determined by the detected minimal value and the detected maximal value of the sensor signals equal to the maximal width or a specified width of the viewable screen area of the display, wherein a sensor signal is first offset-and-gain-compensated, then the output width of the compensated sensor signal is divided according a preset threshold value and offset and gain compensation of the sensor signal is further conducted for each divided area.

6. An output compensating device for an image sensor comprising a means for temporally storing sensor (pixel) signals output successively from the image sensor on an image memory, a means for detecting a minimal value and a maximal value of sensor (pixel) signals composing an image taken and output by the image sensor to be displayed on a viewable screen area of a display, a means for offsetting the respective sensor signals to set the detected minimal value of the sensor signal to a lower limit value of the display screen area and a means for adjusting a gain of the sensor signal to make an output width determined by the detected minimal value and the detected maximal value of the sensor signals equal to the maximal width or a specified width of the viewable screen area of the display, wherein a sensor signal is first offset-compensated and gain-compensated, then the output width of the compensated sensor signal is divided by a preset threshold value and offset and gain compensation of the sensor signal is further conducted for each divided area.

7. An output compensating device for an image sensor, comprising a means for temporally storing sensor (pixel) signals output successively from the image sensor on a first image memory, a means for compensating for variations in output characteristics of respective pixels based on the respective sensor (pixel) signals read from the image memory means, a means for storing again compensated sensor (pixel) signals on the image memory, a means for detecting a minimal value and a maximal value of sensor (pixel) signals composing an image taken and output by the image sensor to be displayed on a viewable screen area of a display, a means for offsetting corresponding re-stored sensor (pixel) signals read from the image memory in such a way that the detected minimal value of corresponding sensor signals may be equal to a lower limit value of the display screen area, and a means for adjusting a gain of the sensor signal in such a way that an output width determined by the detected minimal value and the detected maximal value of corresponding sensor signals read from the second image memory may be equal to the maximal width or a specified width of the viewable screen area of the display, wherein a sensor signal is first offset-and-gain compensated, then the output width of the compensated sensor signal is divided according a preset threshold value and offset and gain compensation of the sensor signal is further conducted for each divided area.

8. An output compensating device for an image sensor, comprising a means for temporally storing sensor (pixel) signals output successively from the image sensor on a first image memory, a means for compensating for variations in output characteristics of respective pixels based on the respective sensor signals read from the image memory means, a means for temporally storing the compensated sensor signals on a second image memory, a means for detecting a minimal value and maximal value of sensor signals composing an image taken and output by the image sensor to be displayed on a viewable screen area of a display, a means for offsetting the respective sensor signals read from the second image memory to set the detected minimal value of the corresponding sensor signal to a lower limit value of the display screen area and a means for adjusting a gain of the respective sensor signals read from second image memory to make an output width determined by the detected minimal value and the detected maximal value of the corresponding sensor signals equal to the maximal width or a specified width of the viewable screen area of the display, wherein a sensor signal is first offset-compensated and gain-compensated, then the output width of the compensated sensor signal is divided by a preset threshold value and offset and gain compensation of the sensor signal is further conducted for each divided areas.

9. An output compensating device for an image sensor, comprising a means for detecting a minimal value and maximal value of sensor (pixel) signals composing an image taken and output by the image sensor to be displayed on a viewable screen area of a display, a means for offsetting the detected minimal value of the sensor signal to a lower limit value of the display screen area, and a means for adjusting a gain of the sensor signal in such a way that an output width determined by the detected minimal value and the detected maximal value of the sensor signals may be equal to the maximal width or a specified width of the viewable screen area of the display, wherein a unit pixel of the image sensor is represented by a light sensor circuit which generates sensor current corresponding to a quantity of incident light and converts by a photoelectric converting element into an electric voltage having a logarithmic characteristic in a weak inverse state using a sub-threshold region property of a transistor and, then, produces a sensor signal corresponding to the voltage signal and outputs the sensor signal.

10. An output compensating device for an image sensor comprising a means for temporally storing sensor (pixel) signals output successively from the image sensor on an image memory, a means for detecting a minimal value and a maximal value of sensor pixel) signals comprising an image taken and output by the image sensor to be displayed on a viewable screen area of a display, a means for offsetting the detected minimal value of the sensor signal to a lower limit value of the display screen area, and a means for adjusting a gain of the sensor signal in such a way that an output width determined by the detected minimal value and the detected maximal value of the sensor signals may be equal to the maximal width or a specified width of the viewable screen area of the display, wherein a unit pixel of the image sensor is represented by a light sensor circuit which generates sensor current corresponding to a quantity of incident light and converts by a photoelectric converting element into an electric voltage having a logarithmic characteristic in a weak inverse state using a sub-threshold region property of a transistor and, then, produces a sensor signal corresponding to the voltage signal and outputs the sensor signal.

11. An output compensating device for an image sensor, comprising a means for temporally storing sensor (pixel) signals output successively from the image sensor on an image memory, a means for compensating for variations in output characteristics of respective pixels based on the respective sensor (pixel) signals read from the image memory means, a means for storing again the compensated sensor (pixel) signals on the image memory, a means for detecting a minimal value and a maximal value of sensor (pixel) signals composing an image taken and output by the image sensor to be displayed on a viewable screen area of a display, a means for offsetting corresponding re-stored sensor signals read from the image memory in such a way that the detected minimal value of the sensor signal may be equal to a lower limit value of the display screen area, and a means for adjusting a gain of the re-stored corresponding sensor signal read from the image memory in such a way that an output width determined by the detected minimal value and the detected maximal value of the sensor signals may be equal to the maximal width or a specified width of the viewable screen area of the display, wherein a unit pixel of the image sensor is represented by a light sensor circuit which generates sensor current corresponding to a quantity of incident light and converts by a photoelectric converting element into an electric voltage having a logarithmic characteristic in a weak inverse state using a sub-threshold region property of a transistor and, then, produces a sensor signal corresponding to the voltage signal and outputs the sensor signal.

12. An output compensating device for an image sensor, comprising a means for temporally storing sensor (pixel) signals output successively from the image sensor on a first image memory, a means for compensating for variations in output characteristics of respective pixels based on the respective sensor (pixel) signals read from the image memory means, a means for temporally storing the compensated sensor (pixel) signals on a second image memory, a means for detecting a minimal value and maximal value of sensor (pixel) signals comprising an image taken and output by the image sensor to be displayed on a viewable screen area of a display, a means for offsetting corresponding sensor (pixel) signals read from the second image memory in such a way that the detected minimal value may be equal to a lower limit value of the display screen area, and a means for adjusting a gain of the sensor signal in such a way that an output width determined by the detected minimal value and the detected maximal value of corresponding sensor signals read from the second image memory may be equal to the maximal width or a specified width of the viewable screen area of the display, wherein a unit pixel of the image sensor is represented by a light sensor circuit which generates sensor current corresponding to a quantity of incident light and converts by a photoelectric converting element into an electric voltage having a logarithmic characteristic in a weak inverse state using a sub-threshold region property of a transistor and, then, produces a sensor signal corresponding to the voltage signal and outputs the sensor signal.

* * * * *